United States Patent
Nishimura et al.

(10) Patent No.: US 7,858,231 B2
(45) Date of Patent: Dec. 28, 2010

(54) CURRENT COLLECTOR SHEET AND ELECTROCHEMICAL DEVICE

(75) Inventors: Ken Nishimura, Moriguchi (JP); Naoto Arai, Ikoma (JP); Toru Oshima, Moriguchi (JP); Fumio Daio, Osaka (JP); Munehisa Ikoma, Nara (JP); Hideo Kaiya, Chigasaki (JP)

(73) Assignee: Panasonic Corporation, Osaka (JP)

( * ) Notice: Subject to any disclaimer, the term of this patent is extended or adjusted under 35 U.S.C. 154(b) by 1307 days.

(21) Appl. No.: 11/166,414

(22) Filed: Jun. 27, 2005

(65) Prior Publication Data
US 2005/0284750 A1    Dec. 29, 2005

Related U.S. Application Data

(63) Continuation of application No. PCT/JP03/15756, filed on Dec. 9, 2003.

(30) Foreign Application Priority Data

Dec. 27, 2002   (JP) ............................ 2002-380939
Jan. 28, 2003   (JP) ............................ 2003-018924

(51) Int. Cl.
*H01M 6/48*   (2006.01)
*H01M 6/12*   (2006.01)
*H01M 2/16*   (2006.01)
*C25B 9/06*   (2006.01)

(52) U.S. Cl. ........................ 429/210; 429/246; 429/162; 429/233; 429/234; 204/242; 204/254

(58) Field of Classification Search ........................ None
See application file for complete search history.

(56) References Cited

U.S. PATENT DOCUMENTS

| | | | |
|---|---|---|---|
| 5,415,948 A * | 5/1995 | Gauthier et al. | 429/62 |
| 5,423,110 A | 6/1995 | Gauthier et al. | |
| 5,521,028 A * | 5/1996 | Gauthier et al. | 429/234 |
| 5,567,544 A | 10/1996 | Lyman | |
| 6,235,427 B1 | 5/2001 | Idota et al. | |
| 6,335,114 B1 * | 1/2002 | Ueshima et al. | 429/94 |
| 6,475,664 B1 | 11/2002 | Kawakami et al. | |
| 6,726,733 B2 | 4/2004 | Lee et al. | |
| 7,220,516 B2 * | 5/2007 | Oosawa et al. | 429/210 |
| 7,288,343 B2 * | 10/2007 | Chang et al. | 429/247 |
| 2002/0160258 A1 | 10/2002 | Lee et al. | |

(Continued)

FOREIGN PATENT DOCUMENTS

JP        57-034665        2/1982

(Continued)

OTHER PUBLICATIONS

"Flush." Dictionary.com Unabridged (v 1.1). Random House, Inc. Jun. 20, 2009. <Dictionary.com http://dictionary.reference.com/browse/flush>.*

(Continued)

*Primary Examiner*—Dah-Wei D Yuan
*Assistant Examiner*—Edu E Enin-Okut
(74) *Attorney, Agent, or Firm*—McDermott Will & Emery LLP

(57) ABSTRACT

A current collector sheet for an electrode of an electrochemical device has a conductive area and an insulating area on the surface thereof. Examples of the current collector sheet includes: a current collector sheet including an insulating sheet, wherein the conductive area has a conductive layer formed on the surface of the insulating sheet, and the insulating area has an exposed portion of the insulating sheet; a current collector sheet including a conductive sheet, wherein the insulating area has an insulating layer formed on the surface of the conductive sheet, and the conductive area has an exposed portion of the conductive sheet; and a current collector sheet including a conductive sheet portion and an insulating sheet portion positioned flush with each other, wherein the conductive area has a surface of the conductive sheet portion, and the insulating area has a surface of the insulating sheet portion.

2 Claims, 26 Drawing Sheets

FOREIGN PATENT DOCUMENTS

| | | | |
|---|---|---|---|
| JP | 61-53857 | | 4/1986 |
| JP | 05-314994 | | 11/1993 |
| JP | 06-187996 | | 7/1994 |
| JP | 06-187998 | | 7/1994 |
| JP | 06-231796 | | 8/1994 |
| JP | 06-243877 | | 9/1994 |
| JP | 06-333553 | | 12/1994 |
| JP | 8-115721 A | | 5/1996 |
| JP | 09232003 A | * | 9/1997 |
| JP | 10-302751 | | 11/1998 |
| JP | 11-274004 | | 10/1999 |
| JP | 2000-030746 A | | 1/2000 |
| JP | 2000-294222 A | | 10/2000 |
| JP | 2000-294288 | | 10/2000 |
| JP | 2001-093583 | | 4/2001 |
| JP | 2001-126707 A | | 5/2001 |
| JP | 2001-148244 | | 5/2001 |
| JP | 2001-210304 | | 8/2001 |
| JP | 2001-342782 | | 12/2001 |
| WO | WO 0111705 A1 | * | 2/2001 |
| WO | WO 01/59870 A1 | | 8/2001 |

OTHER PUBLICATIONS

"Peripheral", "periphery". Merriam-Webster Online Dictionary. 2010. Merriam-Webster Online. Jan. 21, 2010. <http://www.merriam-webster.com/dictionary/peripheral>, <http://www.merriam-webster.com/dictionary/periphery>.*

European Search Report issued in Application No./Patent No. 03777423.9-1227 / 1612873 dated on Jul. 31, 2008.

Partial English Translation of Japanese Office Action issued in Japanese Patent Application No. JP 2003-024987 dated Jul. 30, 2009.

Partial English Translation of Japanese Office Action issued in Japanese Patent Application No. JP 2003-018924 dated Jul. 30, 2009.

Partial English Translation of Japanese Office Action issued in Japanese Patent Application No. JP 2003-023619 dated Jul. 30, 2009.

Partial English Translation of Japanese Office Action issued in Japanese Patent Application No. JP 2003-051253 dated Jul. 30, 2009.

Partial English Translation of Japanese Office Action issued in Japanese Patent Application No. JP 2003-023620 dated Feb. 21, 2008.

Partial English Translation of Japanese Office Action, issued in Japanese Patent Application No. JP 2003-091143 dated on Jan. 6, 2009.

Partial English Translation of Japanese Office Action issued in Japanese Patent Application No. JP 2003-053841, dated Apr. 24, 2008.

* cited by examiner

FIG. 1
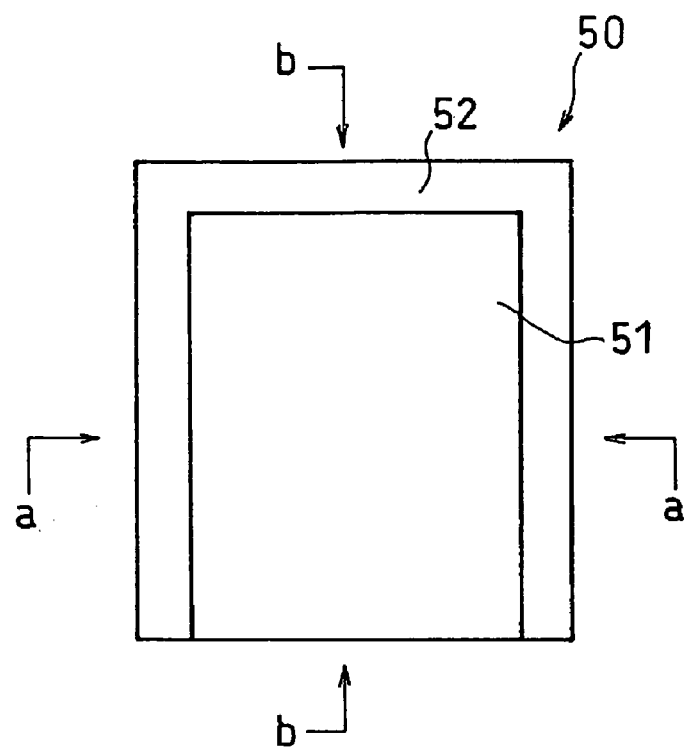
FIG. 2A
FIG. 2B
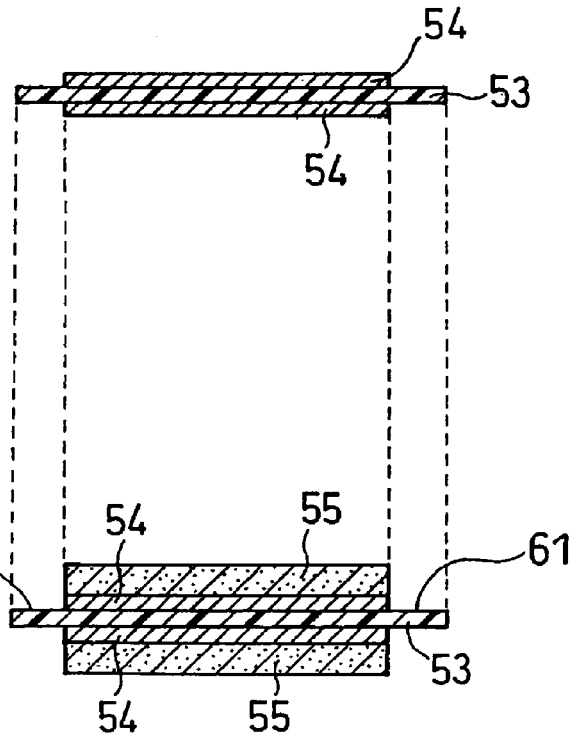

FIG. 4
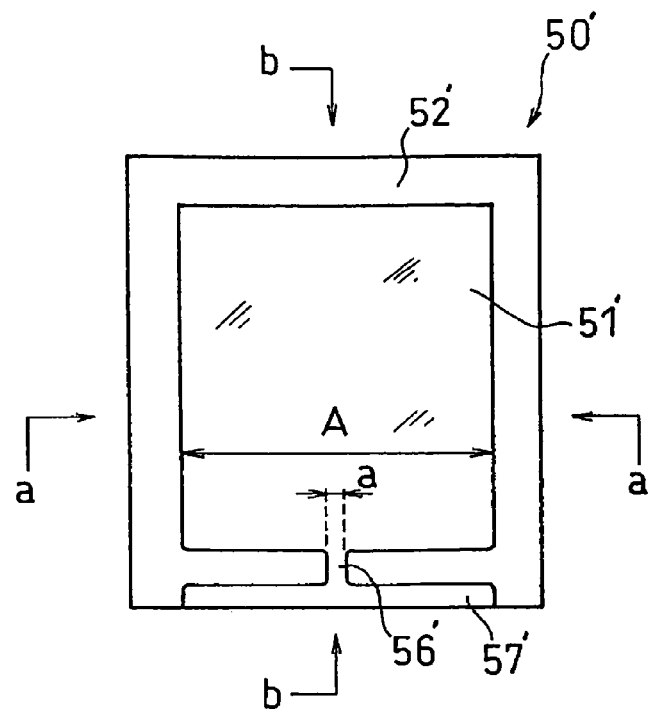
FIG. 5A
FIG. 5B
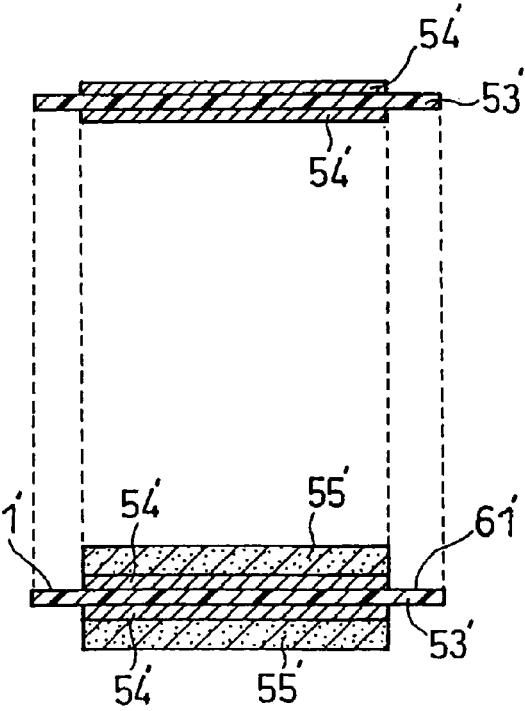

FIG. 9A
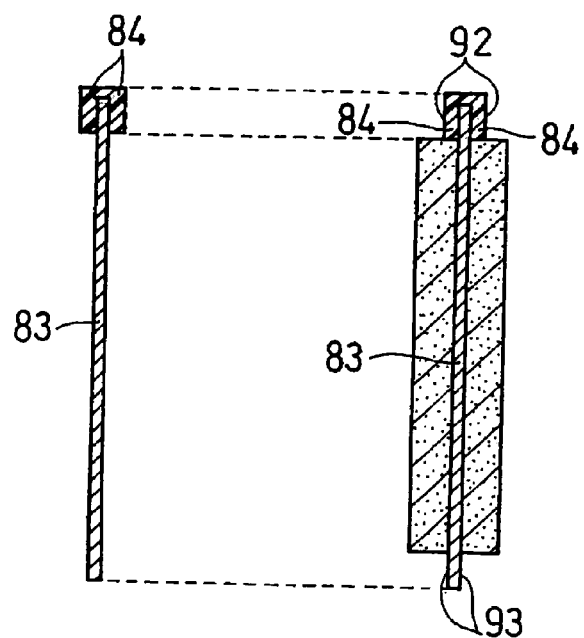
FIG. 9B
FIG. 10
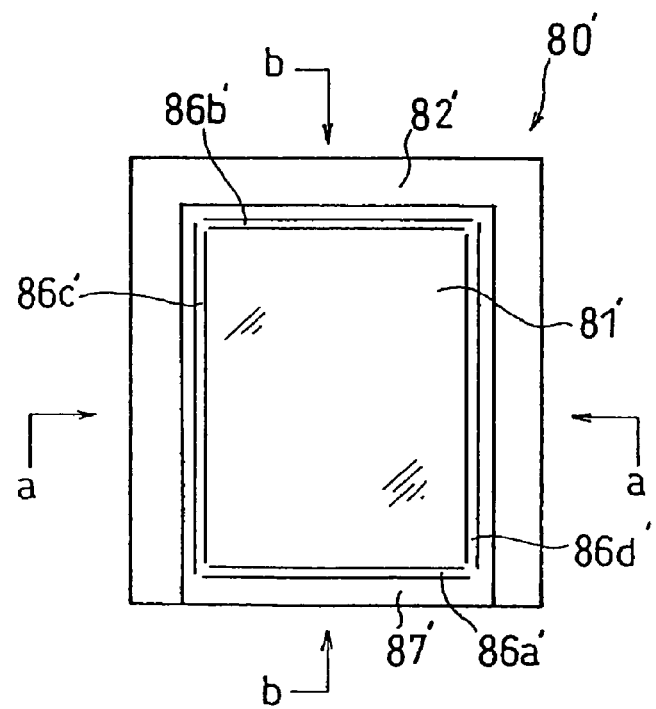

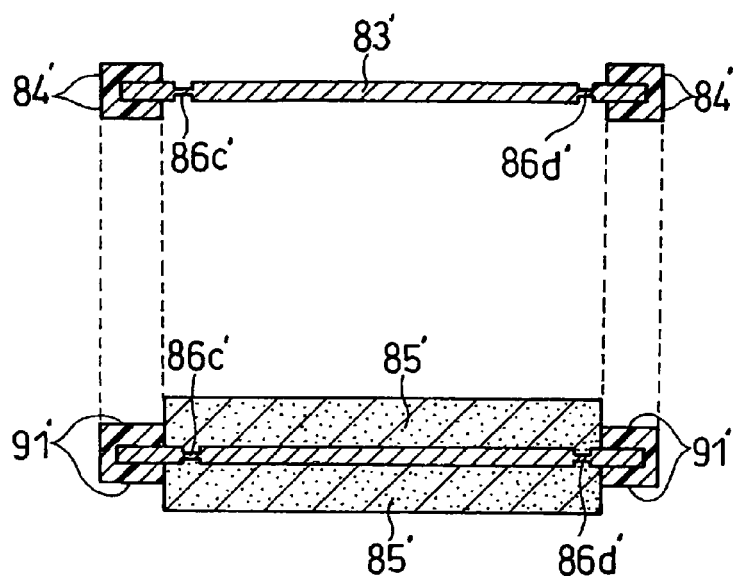
FIG. 11A
FIG. 11B
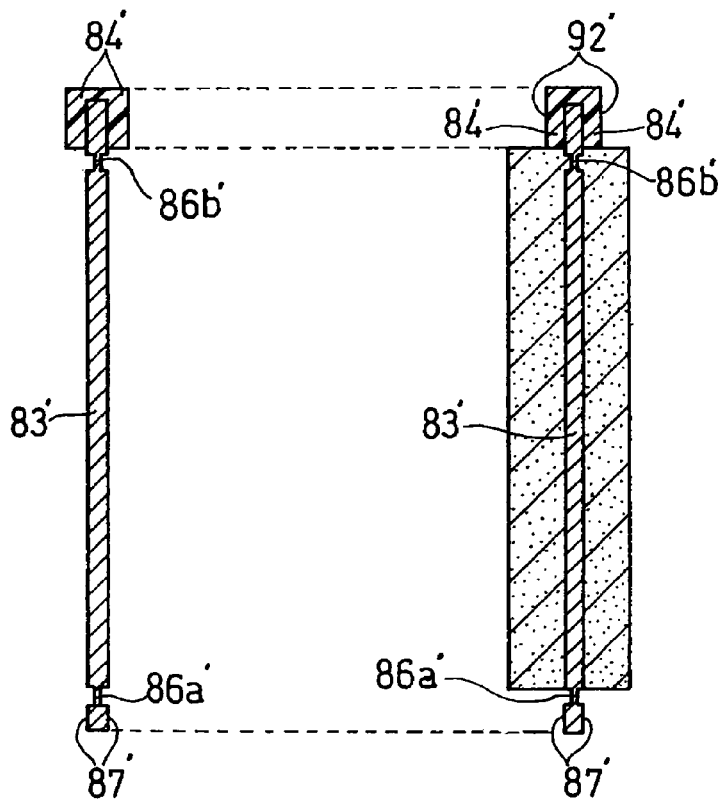
FIG. 12A    FIG. 12B

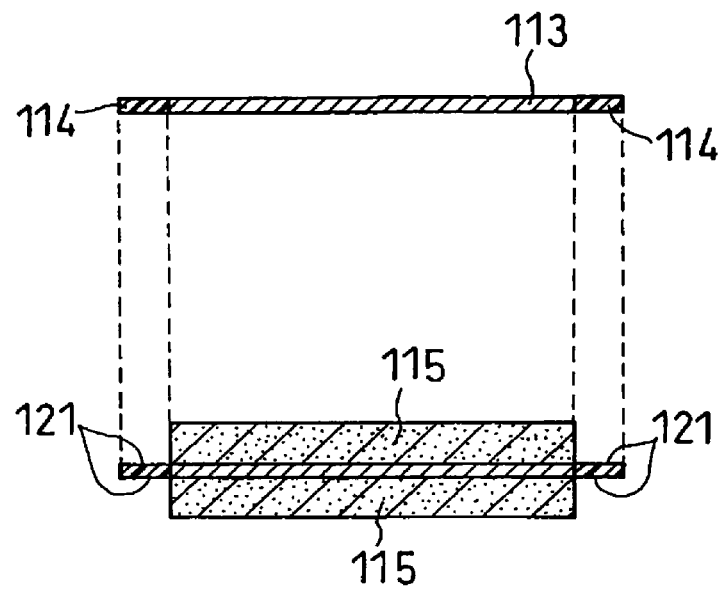
FIG. 15A
FIG. 15B
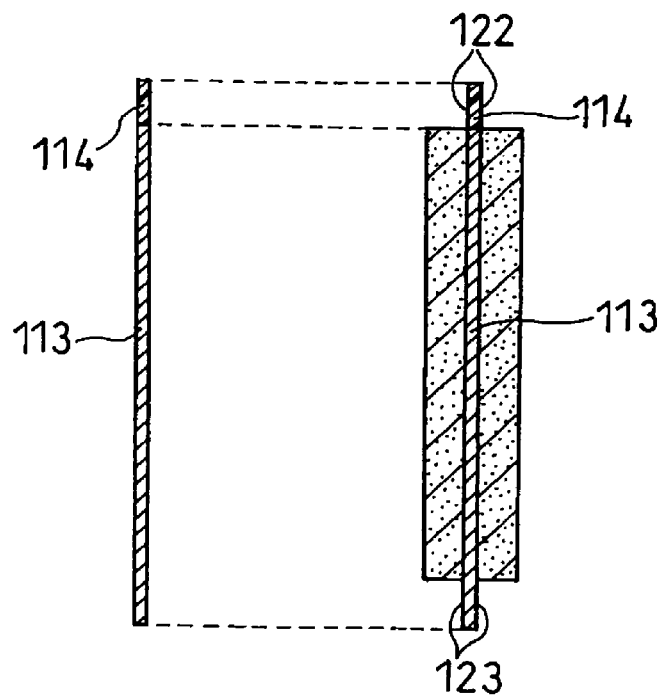
FIG. 16A    FIG. 16B

F I G. 1 9 A      F I G. 1 9 B
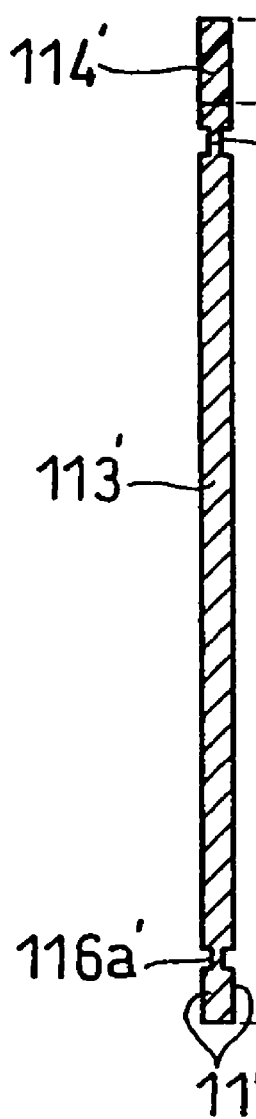
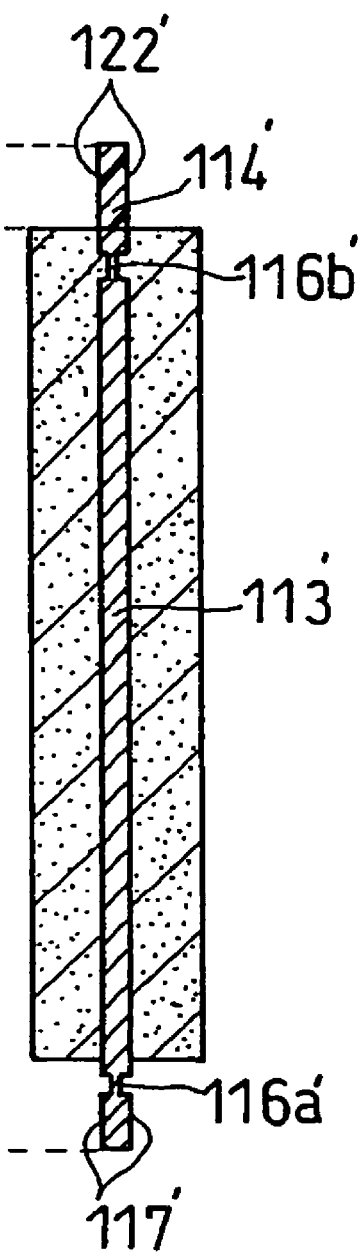

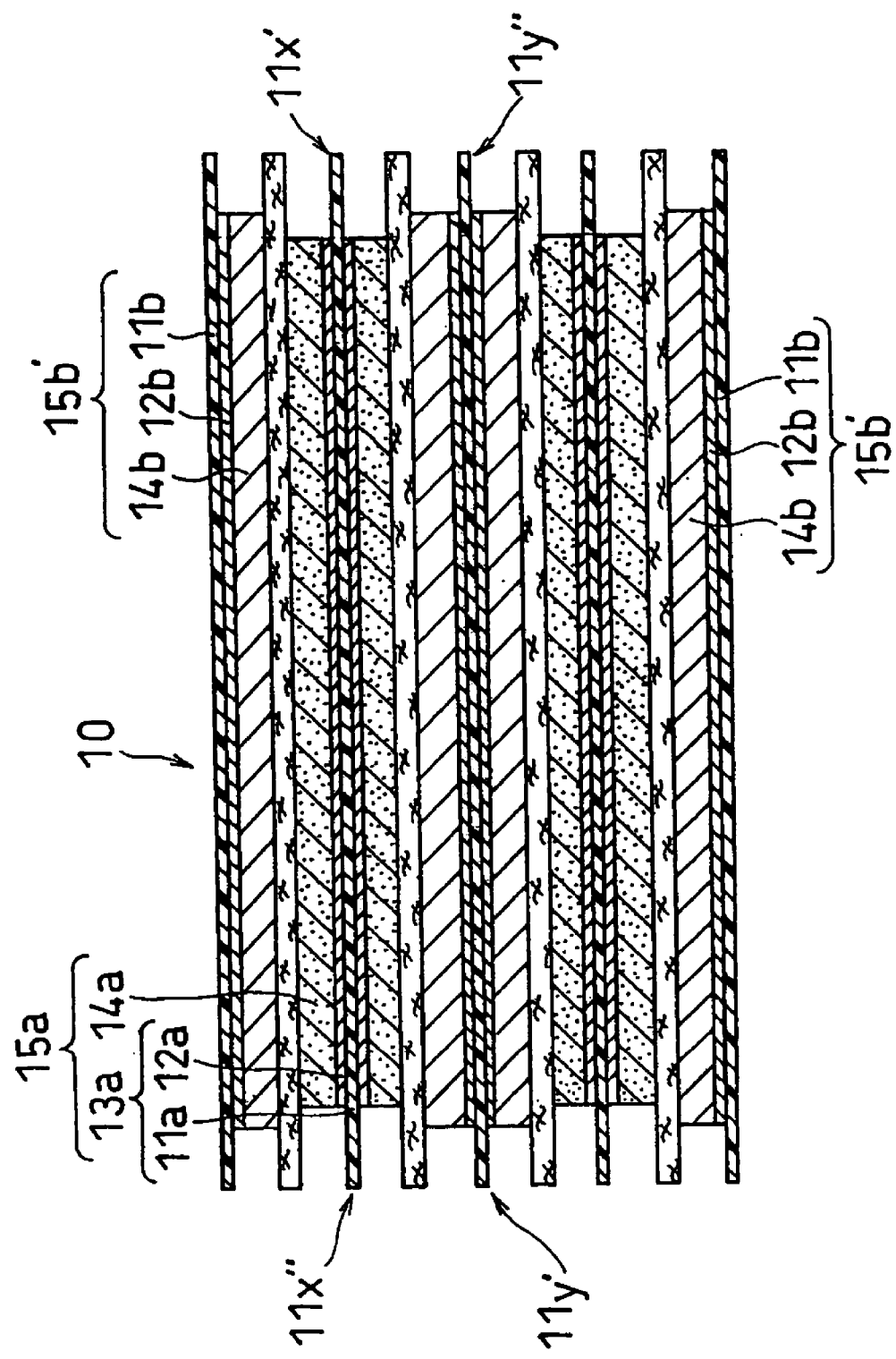

F I G. 2 2
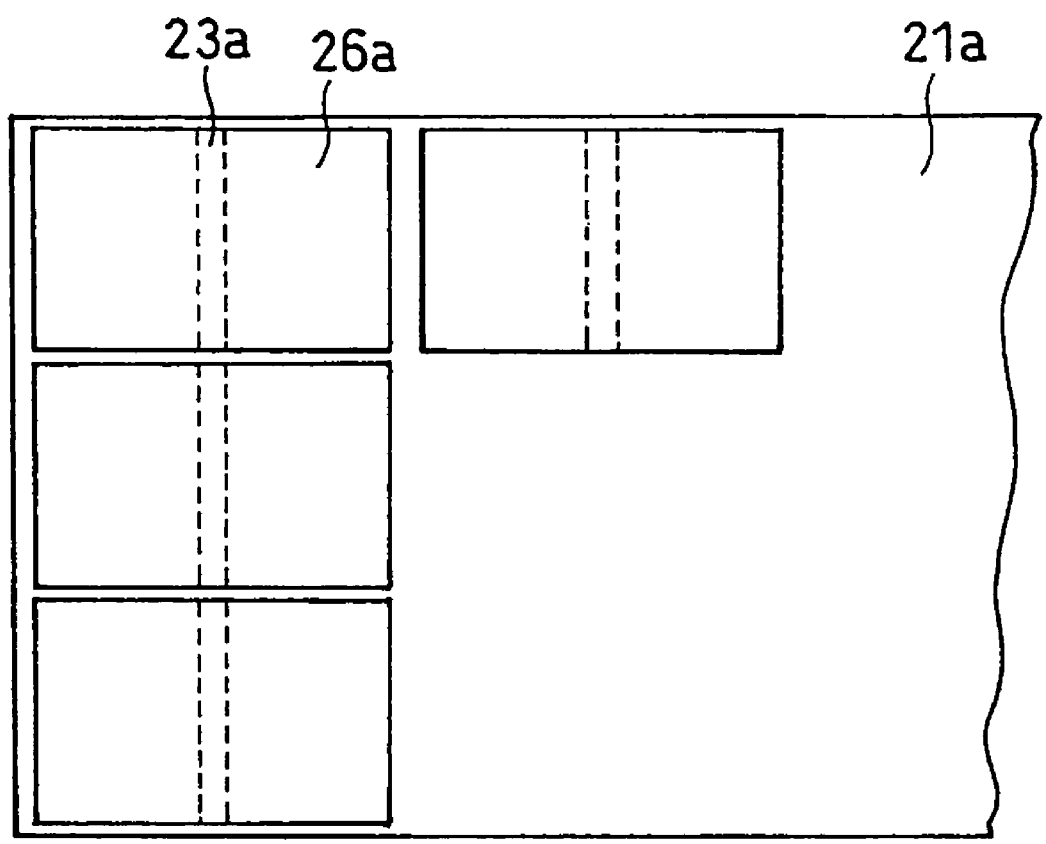

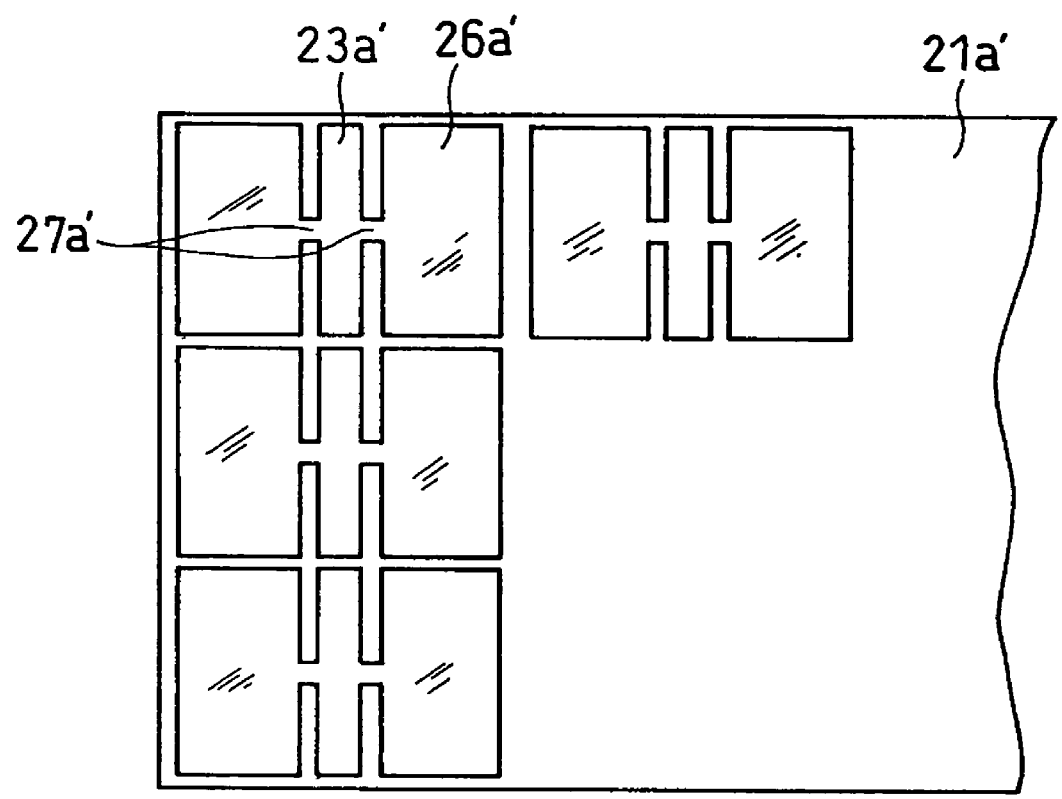
F I G. 2 6

F I G. 2 7
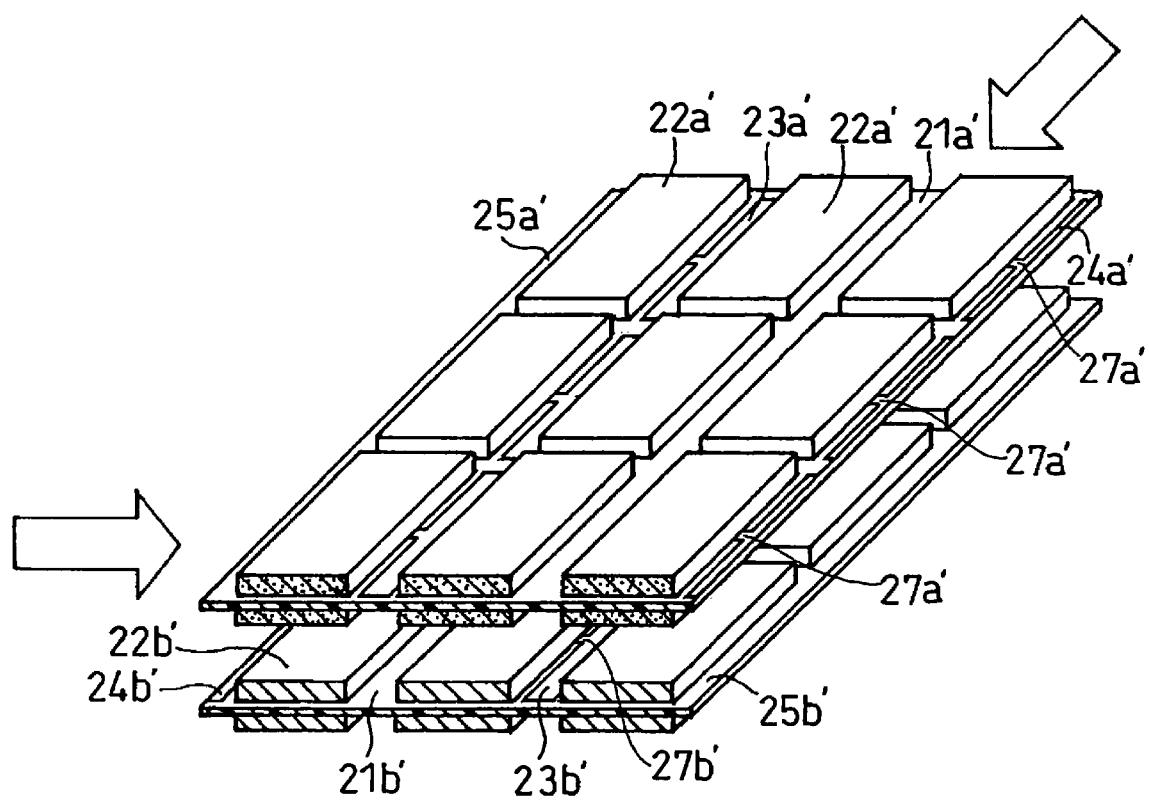

F I G. 2 8
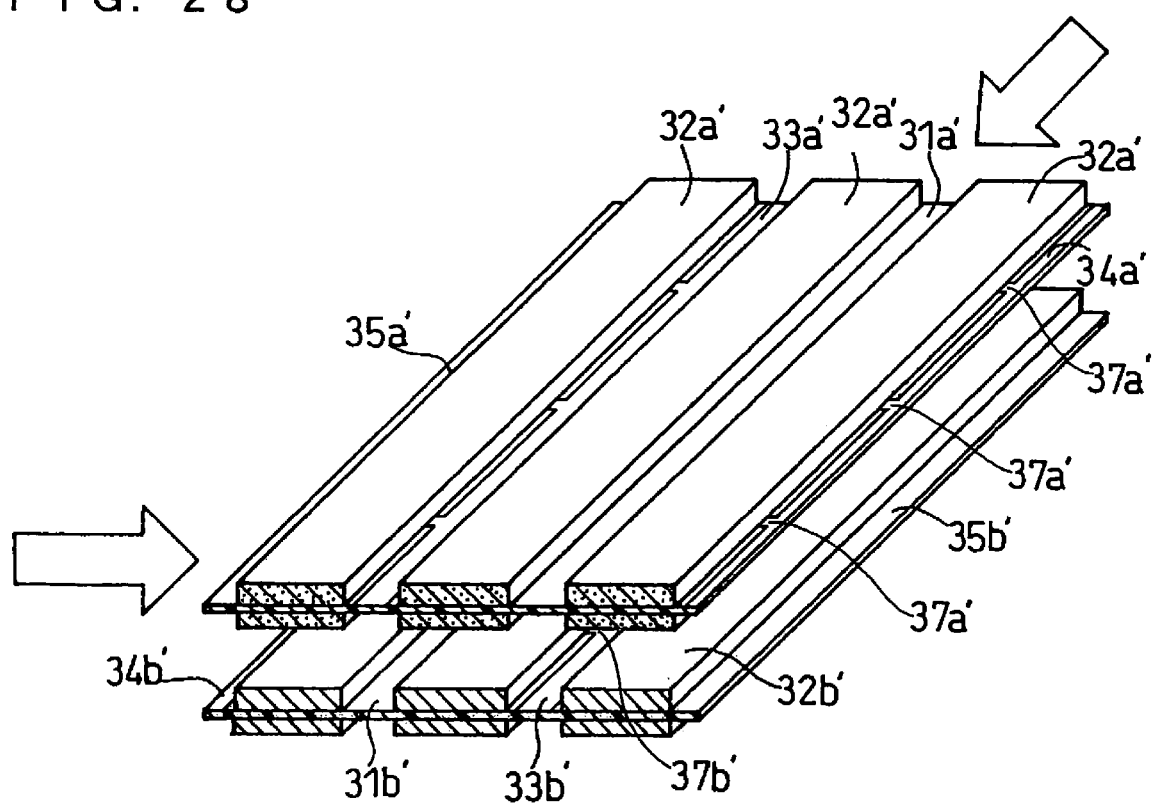

F I G. 3 2
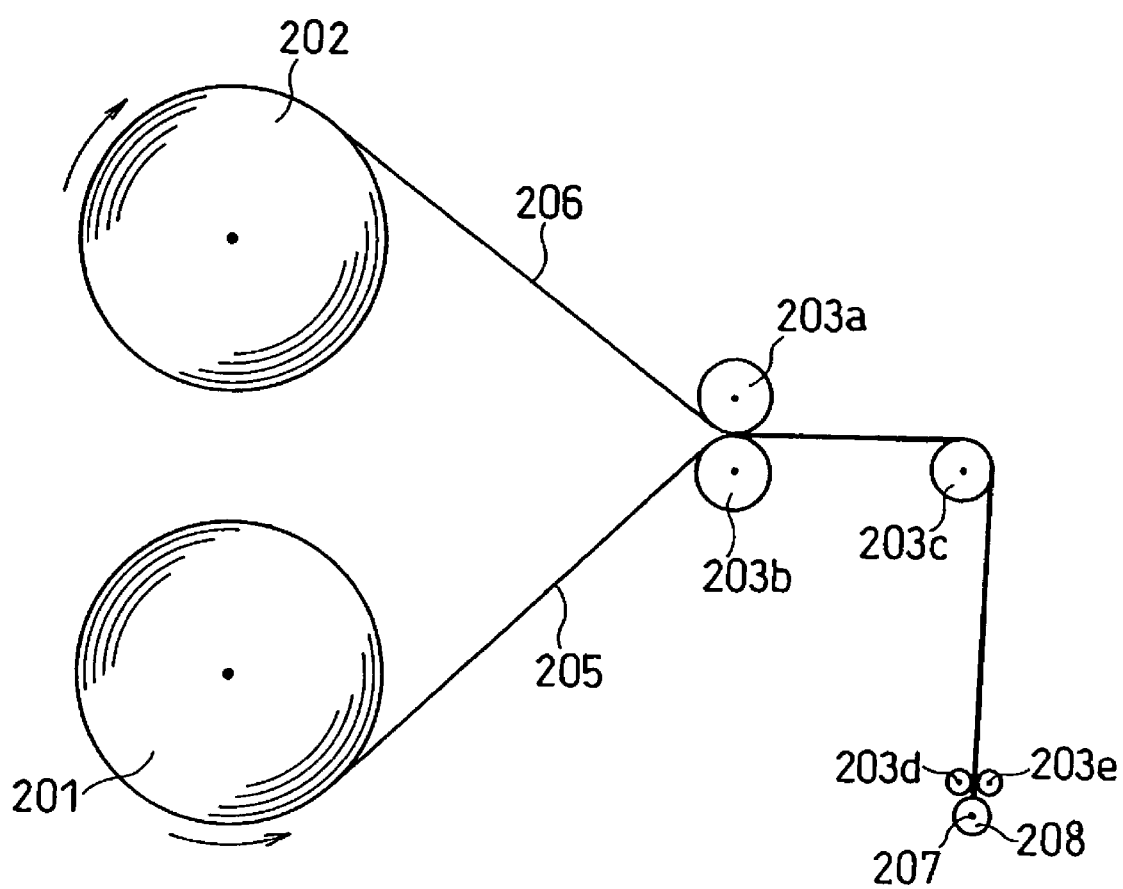

CURRENT COLLECTOR SHEET AND ELECTROCHEMICAL DEVICE

CROSS-REFERENCE TO RELATED APPLICATIONS

This Application is a continuation of International Application No. PCT/JP2003/015756, whose international filing date is Dec. 9, 2003, which in turn claims the benefit of Japanese Patent Application No. 2002-380939, filed on Dec. 27, 2002 and Japanese Patent Application No. 2003-018924, filed on Jan. 28, 2003, the disclosures of which Applications are incorporated by reference herein. The benefit of the filing and priority dates of the International and Japanese Applications is respectfully requested.

BACKGROUND OF THE INVENTION

The present invention relates to a current collector sheet for carrying an electrode material mixture used for an electrochemical device and an electrochemical device.

As electronic and electric equipment is made smaller and lighter, demand is increasing for smaller and lighter electrochemical devices, particularly for smaller and lighter secondary batteries. Secondary batteries currently available, however, have a complicated internal structure so that there is a limit in improving the electric capacity of a product which already has a certain capacity. The complex structure thereof is partly responsible for hindering the improvement of reliability of the battery. For example, a current collecting tab or current collecting lead connected to an electrode can inhibit uniform electrode reaction on the electrode surface. In addition, internal short-circuiting which occurs in the case where metal burrs larger than normal are left in the cutting plane of the lead is also a matter for concern.

An electrochemical device comprises an electrode assembly comprising a positive electrode, a negative electrode and a separator. The electrode assembly has two types: stack type and spiral type. A stack type electrode assembly is produced by placing positive and negative electrodes alternately with a separator interposed therebetween. A spiral type electrode assembly is produced by spirally winding elongated positive and negative electrodes with a separator interposed therebetween. In these electrode assemblies, side faces of the positive and negative electrodes are flush with each other. The positive and negative electrodes have a current collector sheet, the whole of which serves as the conductive area, such as a metal foil. In order to acquire electricity from such side faces without short-circuiting, a current collecting tab or current collecting lead is required.

In view of simplifying the internal structure of the electrochemical device, there has been proposed that a positive electrode is projected from one side face of an electrode assembly and a negative electrode is projected from the other side face opposite to the aforesaid side face, whereby electricity is acquired directly from each of the side faces without a current collecting tab or current collecting lead. For example, for a battery having a stack type electrode assembly, a technique in which projected portions of electrode plates of the same polarity are connected using a metal member is proposed (see Japanese Laid-Open Patent Publication No. 2001-126707). As for a battery having a spiral type electrode assembly, a technique in which a projected core member of an electrode of the same polarity is connected to a flat current collector plate is proposed (see Japanese Laid-Open Patent Publication No. 2000-294222).

A conventional current collector sheet for carrying an electrode material mixture is accompanied by the problem of an increased possibility of internal short-circuiting because the entire sheet serves as the conductive area and a portion where an electrode material mixture is not applied inevitably possesses conductivity. Additionally, in the case where a positive electrode is projected from one side face of an electrode assembly and a negative electrode is projected from the other side face opposite to the aforesaid side face, the structure of a current collector will be complicated and therefore it is required to produce electrode assemblies one by one, making the production process of the electrode assembly complicated. In short, a conventional current collector sheet also has the problem that a plurality of electrode assemblies cannot be produced at one time.

Meanwhile, in the development of producing compact secondary batteries, studies have been conducted on a secondary battery comprising a bipolar type electrode which has an advantage of less number of components (see Japanese Laid-Open Patent Publication No. 2000-30746). It is, however, crucial to prevent short-circuiting due to an electrolyte in the secondary battery comprising a bipolar type electrode. Accordingly, there is need for something to be done to its production process.

A bipolar type electrode is mainly used in a stack type electrode assembly although most of secondary batteries employ a spiral type electrode assembly. The reason why a bipolar type electrode is not used in a spiral type electrode assembly is because it makes the structure of the electrode assembly complicated. In order to ensure insulation between electrodes in a spiral type electrode assembly, various measures will be necessary, which will make the structure complicated, so that there is no advantage in using a bipolar type electrode.

As for a common spiral type electrode assembly, on the other hand, its typical production requires four hoops in total: a hoop comprising an elongated positive electrode, a hoop comprising an elongated negative electrode and two hoops comprising a separator. This makes its production process complicated, likely to cause problems such as displacement during spiral winding process.

BRIEF SUMMARY OF THE INVENTION

The present invention is intended to solve the above problems by forming both a conductive area and an insulating area on the surface of a current collector sheet. According to the present invention, it is possible to expose the insulating area without an electrode material mixture carried thereon while an electrode material mixture is carried on the conductive area of a current collector sheet. Such structure greatly reduces the possibility of short-circuiting because a portion of the current collector sheet without an electrode material mixture applied thereon comprises an insulating area. Moreover, the current collecting structure is simplified because the conductive area of the current collector sheet of one electrode and the insulating area of the current collector sheet of another electrode can be alternately arranged at the current collecting area. As described above, according to the present invention, it is possible to provide a highly reliable electrochemical device with a simplified current collecting structure and a high electric capacity. Further, according to the present invention, a plurality of electrochemical devices can be efficiently produced at a time.

In a preferred embodiment of the present invention, an electrochemical device having a structure described above is equipped with a function for breaking an overcurrent in case of short-circuiting or the like from the viewpoint of further enhancement of safety.

In an embodiment of the present invention, a secondary battery comprising a bipolar electrode with a high capacity capable of achieving size reduction can be provided. Furthermore, according to the present invention, even when a bipolar electrode is used, it is possible to simplify the production process for a spiral type electrode and to greatly reduce the possibility of displacement during winding process.

More specifically, the present invention is directed to a current collector sheet for carrying an electrode material mixture for use in an electrode for an electrochemical device, the current collector sheet comprising a conductive area and an insulating area on the surface thereof.

As the current collector sheet comprising a conductive area and an insulating area on the surface thereof, there are the following three types of current collector sheets, for example.

(a) A current collector sheet including an insulating sheet, the conductive area comprising a conductive layer formed on the surface of the insulating sheet, and the insulating area comprising an exposed portion of the insulating sheet (hereinafter referred to as "current collector sheet A").

(b) A current collector sheet including a conductive sheet, the insulating area comprising an insulating layer formed on the surface of the conductive sheet, and the conductive area comprising an exposed portion of the conductive sheet (hereinafter referred to as "current collector sheet B").

(c) A current collector sheet comprising a conductive sheet portion and an insulating sheet portion positioned flush with each other, the conductive area comprising a surface of said conductive sheet portion, and the insulating area comprising a surface of the insulating sheet portion (hereinafter referred to as "current collector sheet C").

In the current collector sheet A, the conductive layer preferably comprises at least one selected from the group consisting of a vapor-deposited metal layer and a plated metal layer. The vapor-deposited metal layer is preferably formed by at least one selected from the group consisting of a resistance heating method, an rf heating method and an electron-beam method.

In the current collector sheet B, the insulating layer preferably comprises a masking tape. The masking tape preferably comprises a substrate and an adhesive carried on the substrate.

In a preferred embodiment of the current collector sheet A, the conductive layer has a portion whose width vertical to the current collecting direction is formed smaller than the rest thereof, and the small-width portion blows out when a current greater than a given current passes through the small-width portion. The term "blow out" used herein means a mechanism in which, by Joule heat generated when a large current passes through a conductor, the conductor melts to break the current. It is preferred that a width "a" of the small-width portion vertical to the current collecting direction be not greater than 10% of a width "A" of the main portion of the conductive layer vertical to the current collecting direction.

In a preferred embodiment of the current collector sheet B, the conductive sheet has a groove-like thin portion formed vertical to the current collecting direction, and the thin portion blows out when a current greater than a given current passes through the thin portion. A thickness "b" of the thin portion is preferably not greater than 10% of a thickness "B" of the main portion of the conductive sheet.

In a preferred embodiment of the current collector sheet C, the conductive sheet portion has a groove-like thin portion formed vertical to the current collecting direction, and the thin portion blows out when a current greater than a given current passes through the thin portion. A thickness "c" of the thin portion is preferably not greater than 10% of a thickness "C" of the main portion of the conductive sheet portion.

The term "main portion" of the conductive layer, the conductive sheet or the conductive sheet portion means a portion having an electrode material mixture layer carried thereon which serves for collecting electricity from the electrode material mixture.

One embodiment of the current collector sheet A is suitable for the current collector sheet for a bipolar electrode. The conductive area of the current collector sheet for a bipolar electrode comprises a first conductive layer and a second conductive layer. The first conductive layer is formed on one surface of the insulating sheet and the second conductive layer is formed on the other surface thereof. The insulating area comprises a first insulating area and a second insulating area. The first insulating area is positioned on one surface of the insulating sheet and the second insulating area is positioned on the other surface thereof.

The present invention further relates to a bipolar electrode comprising: the aforesaid current collector sheet for a bipolar electrode; a first electrode material mixture layer carried on the first conductive layer; and a second electrode material mixture layer carried on the second conductive layer; wherein the first conductive layer has a first exposed portion where the first electrode material mixture layer is not carried, and the second conductive layer has a second exposed portion where the second electrode material mixture layer is not carried, the first exposed portion and the second exposed portion being positioned at opposite edges of the insulating sheet.

In the bipolar electrode, it is preferred that the first insulating area be positioned at the edge of the insulating sheet opposite to the first exposed portion, and that the second insulating area be positioned at the edge of the insulating sheet opposite to the second exposed portion.

The present invention still further relates to an electrochemical device having an electrode assembly comprising: (a) at least one first electrode; (b) at least one second electrode; and (c) a separator interposed between the first electrode and the second electrode; the first electrode (a) comprising a first current collector sheet having a conductive area and an insulating area on the surface thereof and at least one first electrode material mixture layer carried on the first current collector sheet, the second electrode (b) comprising a second current collector sheet having a conductive area and an insulating area on the surface thereof and at least one second electrode material mixture layer carried on the second current collector sheet, and each of the current collector sheets is any one of the above-described current collector sheets A to C (hereinafter referred to as "electrochemical device X").

The first electrode material mixture layer can be carried on the conductive area of the first current collector sheet while it is not carried on the insulating area. Likewise, the second electrode material mixture layer can be carried on the conductive area of the second current collector sheet while it is not carried on the insulating area.

In the electrochemical device X, the conductive area of the first current collector sheet can be connected to a first terminal at a first side face of the electrode assembly, and the conductive area of the second current collector sheet can be connected to a second terminal at a second side face of the electrode assembly. Likewise, the insulating area of the first current collector sheet can be arranged at the second side face of the electrode assembly, and the insulating area of the second current collector sheet can be arranged at the first side face of the electrode assembly.

In the electrochemical device X, the first side face and the second side face are preferably positioned opposite each other in the electrode assembly.

In the electrochemical device X, the first side face can have a first insulating material portion for insulating the first terminal from the second electrode, and the second side face can have a second insulating material portion for insulating the second terminal from the first electrode.

In the electrochemical device X, the side faces of the electrode assembly, other than the first side face and the second side face, may have the insulating area of the first current collector sheet and the insulating area of the second current collector sheet. In other words, in the electrochemical device X, the electrode assembly can have, other than the first side face and the second side face, side faces where the insulating area of the first current collector sheet and/or the insulating area of the second current collector sheet are disposed.

The present invention further relates to an electrochemical device having an electrode assembly comprising: (a) at least one first electrode; (b) at least one second electrode; and (c) a separator interposed between the first electrode and the second electrode; the first electrode (a) comprising a first current collector sheet and at least one first electrode material mixture layer carried on the first current collector sheet, the second electrode (b) comprising a second current collector sheet and at least one second electrode material mixture layer carried on the second current collector sheet, and at least one of the first current collector sheet and the second current collector sheet is any one of the above-described current collector sheets A to C (hereinafter referred to as "electrochemical device Y").

In the electrochemical device Y, preferably, the first current collector sheet is connected to a first terminal at a first side face of the electrode assembly, and the second current collector sheet is connected to a second terminal at a second side face of the electrode assembly. It is preferred that the first side face and the second side face are positioned opposite each other in the electrode assembly.

In the electrochemical device Y, the first side face can have a first insulating material portion for insulating the first terminal from the second electrode, and the second side face can have a second insulating material portion for insulating the second terminal from the first electrode.

In the electrochemical device Y, the electrode assembly can have, other than the first side face and the second side face, side faces where the insulating area of the first current collector sheet and/or the insulating area of the second current collector sheet are disposed. In other words, the side faces of the electrode assembly, other than the first side face and the second side face, may be provided with the insulating area of the first current collector sheet and the insulating area of the second current collector sheet.

The present invention further relates to an electrochemical device comprising: (a) at least one of the aforesaid bipolar electrode; and (b) a separator interposed between the first electrode material mixture layer and the second electrode material mixture layer (hereinafter referred to as "electrochemical device Z"). In a spiral type battery, the bipolar electrode and the separator are laminated and spirally wound to form a cylindrical electrode assembly.

The present invention includes all of the following embodiments.

An electrochemical device having an electrode assembly in which a plurality of first electrodes and a plurality of second electrodes are alternately laminated with separators interposed between each electrode, wherein each of the plurality of first electrodes comprises a first current collector sheet having a conductive area and an insulating area on the surface thereof and at least one first electrode material mixture layer carried on the first current collector sheet, each of the plurality of second electrodes comprises a second current collector sheet having a conductive area and an insulating area on the surface thereof and at least one second electrode material mixture layer carried on the second current collector sheet, the conductive area of the first current collector sheet is connected to a first terminal at a first side face of the electrode assembly, the conductive area of the second current collector sheet is connected to a second terminal at a second side face of the electrode assembly, the insulating area of the first current collector sheet is arranged at the second side face, the insulating area of the second current collector sheet is arranged at the first side face, and each of the current collector sheets is any one of the above-described current collector sheets A to C (hereinafter referred to as "electrochemical device a").

An electrochemical device having an electrode assembly in which a plurality of first electrodes and a plurality of second electrodes are alternately laminated with separators interposed between each electrode, wherein each of the plurality of first electrodes comprises a first current collector sheet having a conductive area and an insulating area on the surface thereof and at least one first electrode material mixture layer carried on the first current collector sheet, each of the plurality of second electrodes comprises a second current collector sheet having a conductive area and an insulating area on the surface thereof and at least one second electrode material mixture layer carried on the second current collector sheet, the conductive area of the first current collector sheet is connected to a first terminal at a first side face of the electrode assembly, the conductive area of the second current collector sheet is connected to a second terminal at a second side face of the electrode assembly, the insulating area of the first current collector sheet is arranged at the second side face, the insulating area of the second current collector sheet is arranged at the first side face, the first side face has a first insulating material portion for insulating the first terminal from the second electrode, the second side face has a second insulating material portion for insulating the second terminal from the first electrode, and each of the current collector sheets is any one of the above-described current collector sheets A to C (hereinafter referred to as "electrochemical device b").

An electrochemical device having an electrode assembly in which a plurality of first electrodes and a plurality of second electrodes are alternately laminated with separators interposed between each electrode, wherein each of the plurality of first electrodes comprises a first current collector sheet having a conductive area and an insulating area on the surface thereof and at least one first electrode material mixture layer carried on the first current collector sheet, each of the plurality of second electrodes comprises a second current collector sheet having a conductive area and an insulating area on the surface thereof and at least one second electrode material mixture layer carried on the second current collector sheet, the conductive area of the first current collector sheet is connected to a first terminal at a first side face of the electrode assembly, the conductive area of the second current collector sheet is connected to a second terminal at a second side face of the electrode assembly, the insulating area of the first current collector sheet is arranged at the side faces of the electrode assembly except the first side face, the insulating area of the second current collector sheet is arranged at the side faces of the electrode assembly except the second side face, and each of the current collector sheets is any one of the above-described current collector sheets A to C (hereinafter referred to as "electrochemical device c").

An electrochemical device having an electrode assembly in which a plurality of first electrodes and a plurality of second electrodes are alternately laminated with separators interposed between each electrode, wherein each of the plurality of first electrodes comprises a first current collector sheet having a conductive area and an insulating area on the surface thereof and at least one first electrode material mixture layer carried on the first current collector sheet, each of the plurality of second electrodes comprises a second current collector sheet having a conductive area and an insulating area on the surface thereof and at least one second electrode material mixture layer carried on the second current collector sheet, the conductive area of the first current collector sheet is connected to a first terminal at a first side face of the electrode assembly, the conductive area of the second current collector sheet is connected to a second terminal at a second side face of the electrode assembly, the insulating area of the first current collector sheet is arranged at the side faces of the electrode assembly except the first side face, the insulating area of the second current collector sheet is arranged at the side faces of the electrode assembly except the second side face, the first side face has a first insulating material portion for insulating the first terminal from the second electrode, the second side face has a second insulating material portion for insulating the second terminal from the first electrode, and each of the current collector sheets is any one of the above-described current collector sheets A to C (hereinafter referred to as "electrochemical device d").

An electrochemical device having an electrode assembly in which a first electrode and a second electrode are wound with a separator interposed therebetween, wherein the first electrode comprises a first current collector sheet having a conductive area and an insulating area on the surface thereof and at least one first electrode material mixture layer carried on the first current collector sheet, the second electrode comprises a second current collector sheet having a conductive area and an insulating area on the surface thereof and at least one second electrode material mixture layer carried on the second current collector sheet, the conductive area of the first current collector sheet is connected to a first terminal at a first bottom of the electrode assembly, the conductive area of the second current collector sheet is connected to a second terminal at a second bottom of the electrode assembly, the insulating area of the first current collector sheet is arranged at the second bottom, the insulating area of the second current collector sheet is arranged at the first bottom, and each of the current collector sheets is any one of the above-described current collector sheets A to C (hereinafter referred to as "electrochemical device e").

An electrochemical device having an electrode assembly in which a first electrode and a second electrode are wound with a separator interposed therebetween, wherein the first electrode comprises a first current collector sheet having a conductive area and an insulating area on the surface thereof and at least one first electrode material mixture layer carried on the first current collector sheet, the second electrode comprises a second current collector sheet having a conductive area and an insulating area on the surface thereof and at least one second electrode material mixture layer carried on the second current collector sheet, the conductive area of the first current collector sheet is connected to a first terminal at a first bottom of the electrode assembly, the conductive area of the second current collector sheet is connected to a second terminal at a second bottom of the electrode assembly, the insulating area of the first current collector sheet is arranged at the second bottom, the insulating area of the second current collector sheet is arranged at the first bottom, the first bottom has a first insulating material portion for insulating the first terminal from the second electrode, the second bottom has a second insulating material portion for insulating the second terminal from the first electrode, and each of the current collector sheets is any one of the above-described current collector sheets A to C (hereinafter referred to as "electrochemical device f").

BRIEF DESCRIPTION OF THE SEVERAL VIEWS OF THE DRAWINGS

FIG. 1 is a top plan view of a current collector sheet A according to Embodiment 1 of the present invention.

FIG. 2A is a cross sectional view taken on line a-a of FIG. 1 of the current collector sheet A.

FIG. 2B is a cross sectional view taken on line a-a of FIG. 1 of the current collector sheet A when an electrode material mixture is applied onto the conductive area thereof.

FIG. 4 is a top plan view of a current collector sheet A' according to Embodiment 2 of the present invention.

FIG. 5A is a cross sectional view taken on line a-a of FIG. 4 of the current collector sheet A'.

FIG. 5B is a cross sectional view taken on line a-a of FIG. 4 of the current collector sheet A' when an electrode material mixture is applied onto the conductive area thereof.

FIG. 9A is a cross sectional view taken on line b-b of FIG. 7 of the current collector sheet B.

FIG. 9B is a cross sectional view taken on line b-b of FIG. 7 of the current collector sheet B when an electrode material mixture is applied onto the conductive area thereof.

FIG. 10 is a top plan view of a current collector sheet B' according to Embodiment 4 of the present invention.

FIG. 11A is a cross sectional view taken on line a-a of FIG. 10 of the current collector sheet B'.

FIG. 11B is a cross sectional view taken on line a-a of FIG. 10 of the current collector sheet B' when an electrode material mixture is applied onto the conductive area thereof.

FIG. 12A is a cross sectional view taken on line b-b of FIG. 10 of the current collector sheet B'.

FIG. 12B is a cross sectional view taken on line b-b of FIG. 10 of the current collector sheet B' when an electrode material mixture is applied onto the conductive area thereof.

FIG. 15A is a cross sectional view taken on line a-a of FIG. 14 of the current collector sheet C.

FIG. 15B is a cross sectional view taken on line a-a of FIG. 14 of the current collector sheet C when an electrode material mixture is applied onto the conductive area thereof.

FIG. 16A is a cross sectional view taken on line b-b of FIG. 14 of the current collector sheet C.

FIG. 16B is a cross sectional view taken on line b-b of FIG. 14 of the current collector sheet C when an electrode material is applied onto the conductive area thereof.

FIG. 19A is a cross sectional view taken on line b-b of FIG. 17 of the current collector sheet C'.

FIG. 19B is a cross sectional view taken on line b-b of FIG. 17 of the current collector sheet C' when an electrode material mixture is applied onto the conductive area thereof.

FIG. 21 is a cross sectional view taken on line a-a of FIG. 20 of the stack type electrode assembly according to Embodiment 7 of the present invention.

FIG. 22 is a diagram showing a process of forming a conductive layer on a resin sheet according to Embodiment 8 of the present invention.

FIG. 26 is a diagram showing a process of forming a conductive layer having a small-width portion on a resin sheet according to Embodiment 11 of the present invention.

FIG. 27 is a perspective view of a group of first electrodes and a group of second electrodes according to Embodiment 11 of the present invention.

FIG. 28 is a perspective view of a group of first electrodes and a group of second electrodes according to Embodiment 12 of the present invention.

FIG. 32 is a diagram showing a production process of a spiral type electrode assembly according to Embodiment 15 of the present invention.

DETAILED DESCRIPTION OF THE INVENTION

Embodiment 1

In this embodiment, a description will be given of a current collector sheet (current collector sheet A) having a conductive area and an insulating area on the surface thereof, wherein the current collector sheet includes an insulating sheet, the conductive area comprises a conductive layer formed on the surface of the insulating sheet and the insulating area comprises an exposed portion of the insulating sheet.

Figure 3A:
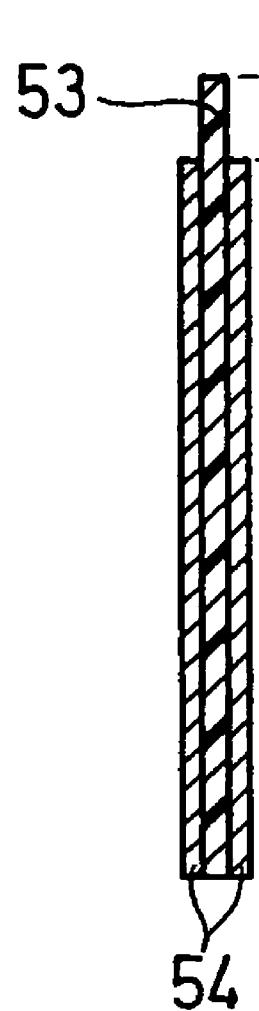
FIG. 3A is a cross sectional view taken on line b-b of FIG. 1 of the current collector sheet A.

FIG. 1 is a top plan view of a current collector sheet A 50. FIG. 2A is a sectional view taken on line a-a of FIG. 1 of the current collector sheet A. FIG. 3A is a sectional view taken on line b-b of FIG. 1 of the current collector sheet A.

The current collector sheet A comprises an insulating sheet 53 and a conductive layer 54 formed on each surface of the insulating sheet 53. The surface of the conductive layer 54 serves as the conductive area 51, and an exposed portion of the insulating sheet 53 serves as the insulating area 52.

Figure 3B:
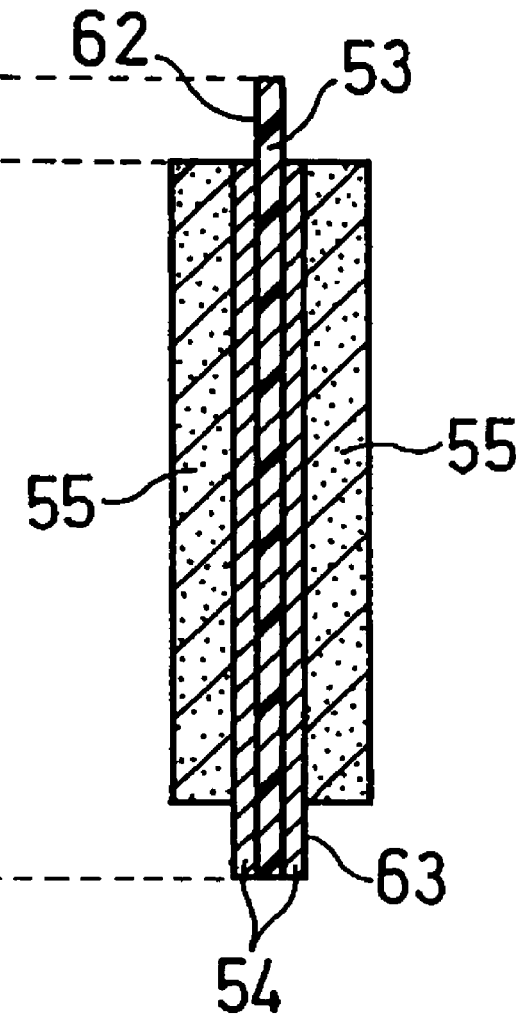
FIG. 3B is a cross sectional view taken on line b-b of FIG. 1 of the current collector sheet A when an electrode material mixture is applied onto the conductive area thereof.

Since both conductive and insulating areas are present on the surface of the current collector sheet A, when the insulating area is left unapplied with an electrode material mixture, the possibility of short-circuiting will be greatly reduced. For example, when an electrode material mixture 55 is applied only onto the conductive area 51, the surface of the insulating sheet will be exposed in electrode material mixture unapplied portions 61 and 62 as shown in FIGS. 2B and 3B. The exposed portions are insulative and therefore will not serve as the direct cause of short-circuiting. An exposed portion 63 of the conductive layer can be used as a connecting point for connecting to a current collecting terminal.

The insulating sheet preferably has a thickness of, for example, 0.5 to 500 μm. The conductive layer preferably has a thickness of 0.01 to 100 μm. The insulating sheet may be an ordinary insulating sheet having a flat surface. Alternatively, it may be a punched sheet, a lath, a porous sheet, a net, a foam, woven fabric or non-woven fabric. An insulating sheet having a rough surface may also be used.

As the insulating sheet, a resin sheet can be used for example. Examples of the resin constituting the resin sheet include: olefin polymers such as polyethylene, polypropylene and polymethylpentene; ester polymers such as polyethylene terephthalate, polybutylene terephthalate, polycyclohexylene dimethylene terephthalate and polyarylate; thioether polymers such as polyphenylene sulfide; aromatic vinyl polymers such as polystyrene; nitrogen-containing polymers such as polyimide and aramid resin; fluorocarbon resins such as polytetrafluoroethylene and polyvinylidene fluoride. They may be used singly. Alternatively, a copolymer, a polymer alloy and a polymer blend produced by combining two or more of the above may also be used.

As the conductive layer, any electronic conductor that does not cause a chemical change in an assembled battery can be used without limitation. The conductive layer for positive electrode current collector sheet may be made of, for example, stainless steel, aluminum, an aluminum alloy, titanium, carbon or the like. In particular, aluminum and an aluminum alloy are preferably used. The conductive layer for negative electrode current collector sheet may be made of, for example, stainless steel, nickel, copper, a copper alloy, titanium or the like. Particularly, copper and a copper alloy are preferred for use.

The method for forming the conductive layer is not specifically limited. A preferred method is to form, on the insulating sheet, at least one selected from the group consisting of a vapor-deposited metal layer and a plated metal layer. A vapor-deposited metal layer is advantageous particularly when the conductive layer is required to be relatively thin, specifically, not greater than 0.5 μm. A plated metal layer is advantageous particularly when the conductive layer is required to be relatively thick, specifically, over 0.5 μm.

A vapor-deposited metal layer and a plated metal layer may be used together. For example, a vapor-deposited metal layer serving as a base is first pattern-deposited on the insulating sheet, and a plated metal layer is then formed thereon. In this case, it is easy to perform pattern-plating. Accordingly, when a conductive layer with a thickness exceeding 0.5 μm should be formed into a desired pattern, the combined use of a vapor-deposited metal layer and a plated metal layer is extremely advantageous.

The vapor-deposited metal layer may be formed by any method. Examples thereof include a resistance heating method, an rf heating method and an electron-beam method. Particularly, it is preferred to employ at least one selected from the group consisting of an rf heating method and an electron-beam method. A vapor-deposited metal layer having a predetermined pattern is formed by subjecting an insulating sheet covered with a mask having predetermined openings to deposition.

The plated metal layer may be produced by any method. For example, it is preferred to form by an electroplating method or an electroless plating method. A plated metal layer having a predetermined pattern is formed by plating an insulating sheet covered with a mask having predetermined openings.

Embodiment 2

Another embodiment of the current collector sheet A (current collector sheet A') will now be described.

Figures 6A, 6B:
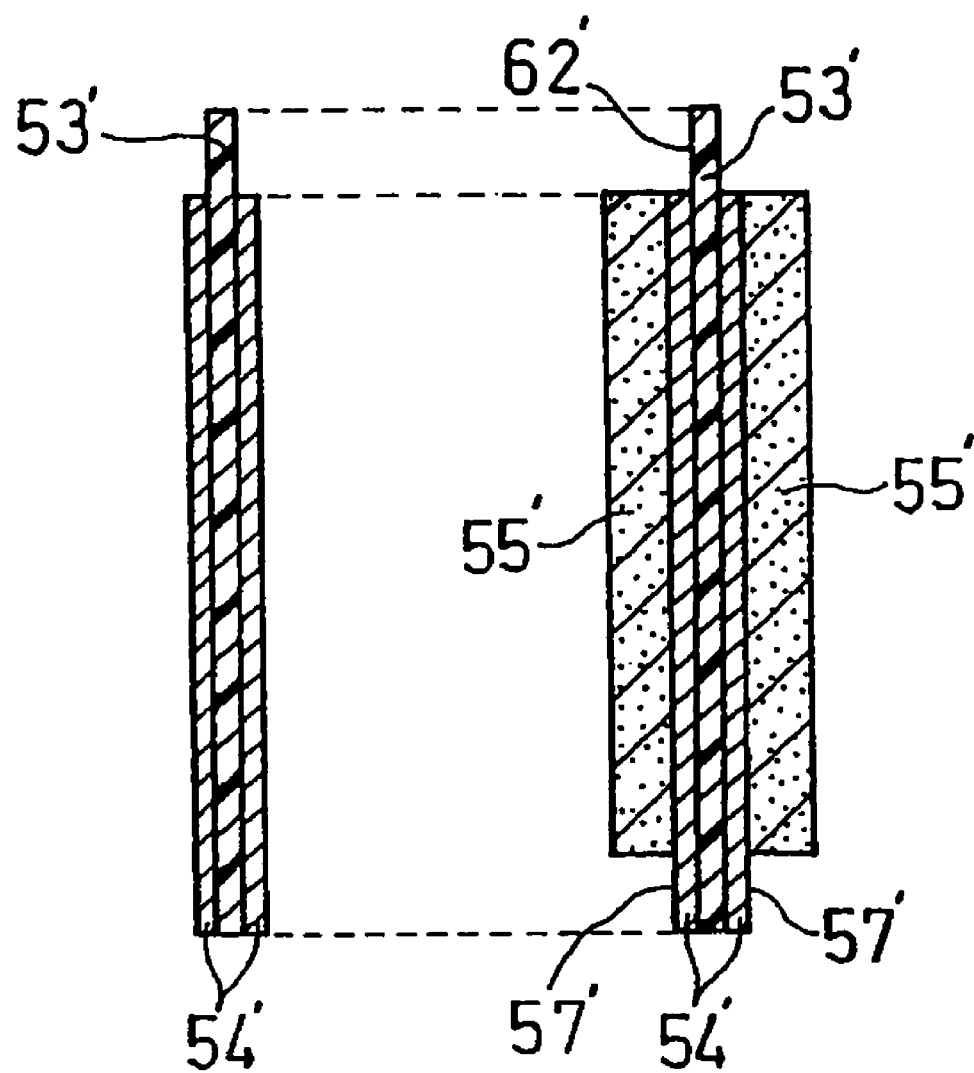
FIG. 6A is a cross sectional view taken on line b-b of FIG. 4 of the current collector sheet A'.
FIG. 6B is a cross sectional view taken on line b-b of FIG. 4 of the current collector sheet A' when an electrode material mixture is applied onto the conductive area thereof.

FIG. 4 is a top plan view of a current collector sheet A'50'. FIG. 5A is a cross sectional view taken on line a-a of FIG. 4 of the current collector sheet A'. FIG. 6A is a cross sectional view taken on line b-b of FIG. 4 of the current collector sheet A'.

The current collector sheet A' comprises an insulating sheet 53' and a conductive layer 54' formed on each surface of the insulating sheet 53'. The surface of the conductive layer 54' serves as the conductive area 51', and an exposed portion of the insulating sheet 53' serves as the insulating area 52'.

For example, when an electrode material mixture 55' is applied only onto the conductive area 51', the surface of the insulating sheet will be exposed in electrode material mixture unapplied portions 61' and 62' as shown in FIGS. 5B and 6B. The exposed portions are insulative and therefore will not serve as the direct cause of short-circuiting.

The conductive layer 54' of the current collector sheet A' has a portion whose width vertical to the current collecting direction is shorter than the rest. The small-width portion 56' functions as an overcurrent shutdown unit. To be more specific, in the case where a current greater than normal passes through the small-width portion 56' due to short-circuiting or the like, the small-width portion 56' melts to break the connection between the main portion of the conductive area 51' carrying the electrode material mixture thereon and a connecting point 57' for connecting to a current collecting terminal.

A plurality of such overcurrent shutdown units may be formed. Although the width "a" vertical to the current collecting direction is varied depending on various factors such as the number of the small-width portions to be formed, the thickness of the conductive layer and the surface area of the conductive layer, it is preferably not greater than 10% of the width "A" of the main portion of the conductive layer vertical to the current collecting direction (i.e. average current flow direction). If the width "a" is excessively elongated, the operability of the blow-out mechanism will be greatly reduced.

The conductive layer with a shape described above may be formed by any method. An example method is to form a vapor-deposited metal layer or plated metal layer on the insulating sheet and then trim the vapor-deposited metal layer or plated metal layer by a laser.

Embodiment 3

In this embodiment, a description will be given of a current collector sheet (current collector sheet B) having a conductive area and an insulating area on the surface thereof, wherein the current collector sheet includes a conductive sheet, the insulating area comprises an insulating layer formed on the surface of the conductive sheet and the conductive area comprises an exposed portion of the conductive sheet.

Figure 7:
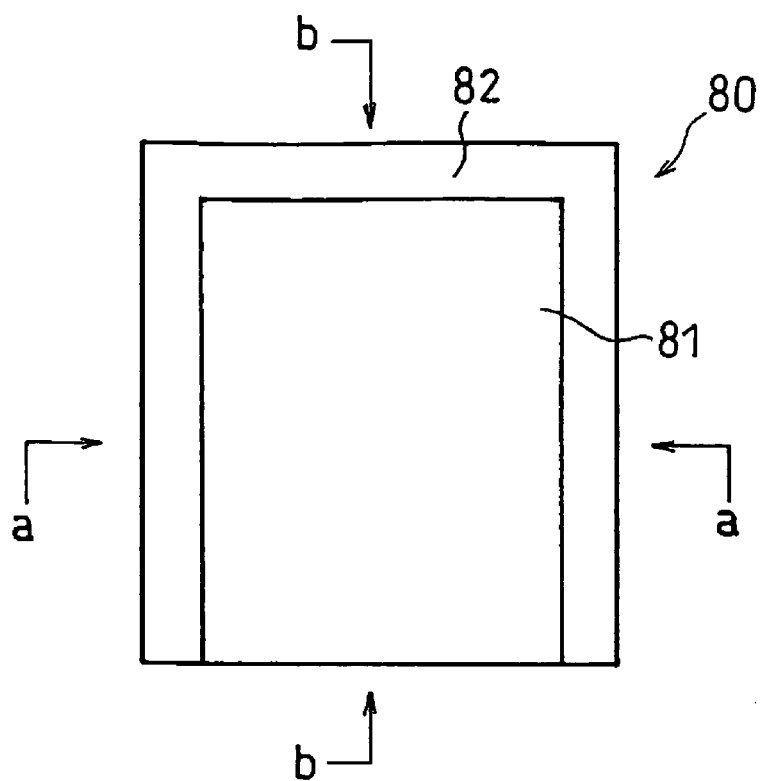
FIG. 7 is a top plan view of a current collector sheet B according to Embodiment 3 of the present invention.
Figure 8A:
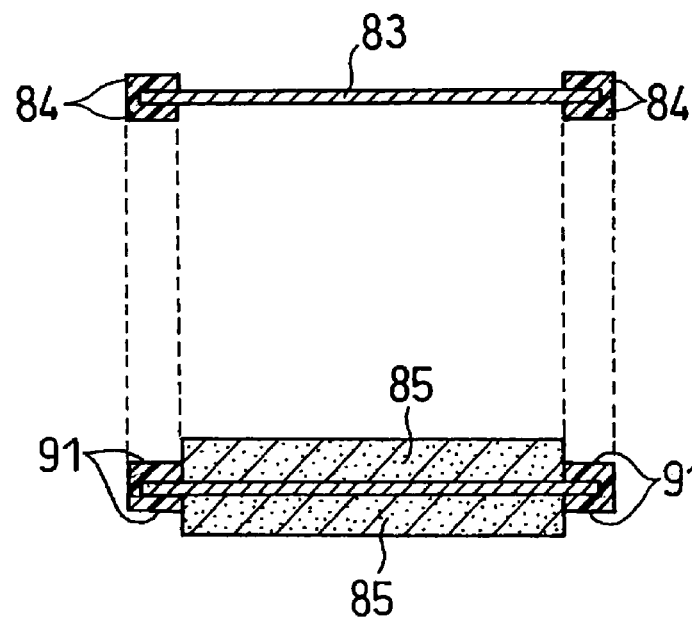
FIG. 8A is a cross sectional view taken on line a-a of FIG. 7 of the current collector sheet B.

FIG. 7 is a top plan view of a current collector sheet B80. FIG. 8A is a sectional view taken on line a-a of FIG. 7 of the current collector sheet B. FIG. 9A is a sectional view taken on line b-b of FIG. 7 of the current collector sheet B.

The current collector sheet B comprises a conductive sheet 83 and an insulating layer 84 formed on each surface of the conductive sheet 83. The surface of the insulating layer 84 serves as the insulating area 82, and an exposed portion of the conductive sheet 83 serves as the conductive area 81.

Figure 8B:
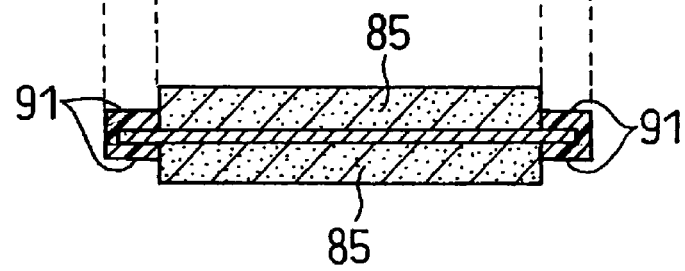
FIG. 8B is a cross sectional view taken on line a-a of FIG. 7 of the current collector sheet B when an electrode material mixture is applied onto the conductive area thereof.

Since both conductive and insulating areas are present on the surface of the current collector sheet B, when the insulating area is left unapplied with an electrode material mixture, the possibility of short-circuiting will be greatly reduced. For example, when an electrode material mixture 85 is applied only onto the conductive area 81, the surface of the insulating layer will be exposed in electrode material mixture unapplied portions 91 and 92 as shown in FIGS. 8B and 9B. These exposed portions are insulative and therefore will not serve as the direct cause of short-circuiting. An exposed portion 93 of the conductive sheet can be used as a connecting point for connecting to a current collecting terminal.

The conductive sheet preferably has a thickness of, for example, 0.5 to 500 μm. The insulating layer preferably has a thickness of 0.01 to 100 μm. The conductive sheet may be an ordinary insulating sheet having a flat surface. Alternatively, it may be a punched sheet, a lath, a porous sheet, a net, a foam, woven fabric or non-woven fabric. A conductive sheet having a rough surface may also be used.

As the conductive sheet, any electronic conductor that does not cause a chemical change in an assembled battery can be used without limitation. A metal sheet can be used, for example. The conductive sheet for positive electrode may be made of, for example, stainless steel, aluminum, an aluminum alloy, titanium, carbon or the like. Particularly, aluminum and an aluminum alloy are preferred for use. The conductive sheet for negative electrode may be made of, for example, stainless steel, nickel, copper, a copper alloy, titanium or the like. In particular, copper and a copper alloy are preferred for use. A conductive sheet made of a single material may be used. Alternatively, an alloy sheet or plated sheet produced by combining two or more of the above materials may also be used.

Examples of the material for the insulating layer include: olefin polymers such as polyethylene, polypropylene and polymethylpentene; ester polymers such as polyethylene terephthalate, polybutylene terephthalate, polycyclohexylene dimethylene terephthalate and polyarylate; thioether polymers such as polyphenylene sulfide; aromatic vinyl polymers such as polystyrene; nitrogen-containing polymers such as polyimide and aramid resin; fluorocarbon polymers such as polytetrafluoroethylene and polyvinylidene fluoride. They may be used singly. Alternatively, a copolymer, a polymer alloy or a polymer blend produced by combining two or more of the above can also be used.

The method for forming the insulating layer is not specifically limited. For example, the insulating layer can be formed by vapor-depositing an insulating material on a conductive sheet. During the deposition, the conductive sheet is preferably covered with a mask having predetermined openings so as to form a deposited layer having a certain pattern. Alternatively, the insulating layer can be formed by covering a predetermined area of the conductive sheet with an insulating material such as masking tape, insulating tape or resin film.

A masking tape is a preferred material for the insulating area of the current collector sheet in that an insulating layer with a desired shape can be easily formed. The masking tape comprises, for example, a substrate made of a material having chemical resistance to electrolyte and an adhesive carried on the substrate. The thickness of the masking tape is not specifically limited, but preferred is a thickness the same as or thinner than that of the electrode material mixture layer carried on the current collector sheet.

Examples of materials for the substrate for use include: olefin resins such as polyethylene, polypropylene and polymethylpentene; ester resins such as polyethylene terephthalate, polyethylene naphthalate, polycyclohexylene dimethylene terephthalate, polyarylate and polycarbonate; ether resins such as polyethylene oxide, polypropylene oxide, polyacetal, polyphenylene ether, polyether ether ketone and polyether imide; sulfone resins such as polysulfone and polyethersulfone; acrylonitrile resins such as polyacrylonitrile, AS resin and ABS resin; thioether resins such as polyphenylene sulfide; aromatic vinyle resins such as polystyrene; nitrogen-containing resin such as polyimide and aramid resin; fluorocarbon resin such as polytetrafluoroethylene and polyvinylidene fluoride; acrylic resins such as polymethyl methacrylate; and copolymers thereof, polymer alloys thereof and polymer blends thereof. They may be used singly or in combination of two or more. Among them, particularly preferred are polyethylene, polypropylene, polyethylene terephthalate, polyethylene naphthalate, polyphenylene sulfide, polyimide, aramid resin and copolymers thereof, polymer alloys thereof and polymer blends thereof.

The adhesive is not specifically limited. For example, acrylic resins and butyl rubber resin can be used.

Embodiment 4

Another embodiment of the current collector sheet B (current collector sheet B') will now be described.

FIG. 10 is a top plan view of a current collector sheet B'80'. FIG. 11A is a cross sectional view taken on line a-a of FIG. 10 of the current collector sheet B'. FIG. 12A is a cross sectional view taken on line b-b of FIG. 10 of the current collector sheet B'.

The current collector sheet B' comprises a conductive sheet 83' and an insulating layer 84' formed on each surface of the conductive sheet 83'. The surface of the insulating layer 84' serves as the insulating area 82', and an exposed portion of the conductive sheet 83' serves as the conductive area 81'.

For example, when an electrode material mixture 85' is applied only onto the conductive area 81', the surface of the insulating layer will be exposed in electrode material mixture unapplied portions 91' and 92' as shown in FIGS. 11B and 12B. The exposed portions are insulative and therefore will not serve as the direct cause of short-circuiting.

The edge of the conductive sheet 83' not covered with the insulating layer serves as the connecting point 87' of the current collector sheet B' for connecting to a current collecting terminal. Slightly away from the aforesaid edge of the conductive sheet 83' is formed a groove-like thin portion 86a' formed vertical to the current collecting direction. The thin portion 86a' functions as an overcurrent shutdown unit. To be more specific, when a current greater than normal passes through the thin portion 86a' due to short-circuiting or the like, the thin portion 86a' melts to break the connection between the main portion of the conductive area 81' carrying the electrode material mixture thereon and the connecting point 87' for connecting to a current collecting terminal.

As shown in FIGS. 10 to 12, the main portion of the conductive area 81' carrying the electrode material mixture may be surrounded by thin portions 86b', 86c' and 86d' in addition to the thin portion 86a'. In this case, the main portion of the conductive area 81' carrying the electrode material mixture will be completely isolated when a current greater than normal passes through the thin portions to blow out the thin portions. Accordingly, a better current shutdown function can be expected.

Figure 13:
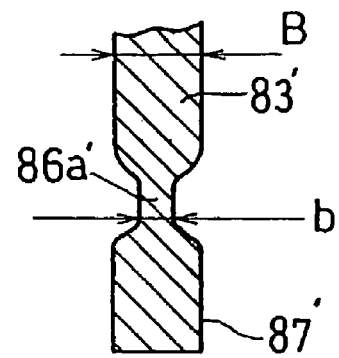
FIG. 13 is an enlarged view of a part of FIG. 12A.

FIG. 13 is an enlarged view of a part of FIG. 12A. The thin portion 86a' preferably has a thickness "b" of not less than 3% of the thickness "B" of the main portion of the conductive sheet 83', more preferably not less than 5% and not greater than 10%. If the percentage of the thickness "b" is greater than that of the thickness "B", the operability of the blow-out mechanism will be greatly reduced.

The thin portions 86b' to 86d' do not necessarily have a thickness the same as the thin portion 86a'. However, similar to the thin portion 86a', the thickness thereof is preferably not less than 3% of the thickness "B", more preferably not less than 5% and not greater than 10%.

Preferred methods for forming the thin portion(s) on the conductive sheet include, but not limited to, a press working method, a laser etching method and a chemical etching method.

Embodiment 5

In this embodiment, a description will be given of a current collector sheet (current collector sheet C) having a conductive area and an insulating area on the surface thereof, wherein the current collector sheet comprises a conductive sheet portion and an insulating sheet portion positioned flush with each other, the conductive area comprises a surface of the conductive sheet portion and the insulating area comprises a surface of the insulating sheet portion.

Figure 14:
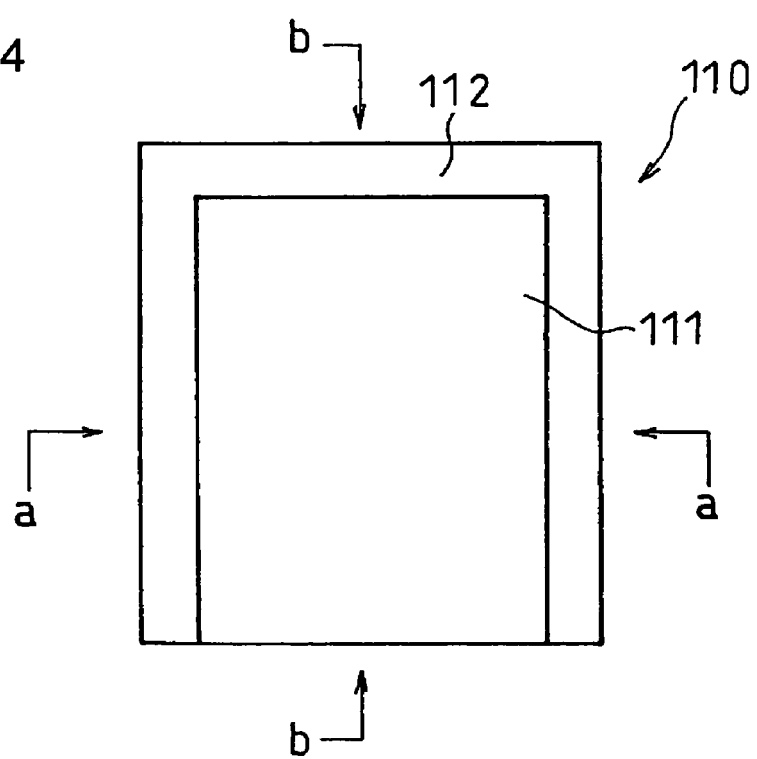
FIG. 14 is a top plan view of a current collector sheet C according to Embodiment 5 of the present invention.

FIG. 14 is a top plan view of a current collector sheet C110. FIG. 15A is a cross sectional view taken on line a-a of FIG. 14 of the current collector sheet C. FIG. 16A is a cross sectional view taken on line b-b of FIG. 14 of the current collector sheet C.

The current collector sheet C comprises a conductive sheet portion 113 and an insulating sheet portion 114 positioned flush with each other. The surface of the conductive sheet portion 113 serves as the conductive area 111, and the surface of the insulating sheet portion 114 serves as the insulating area 112.

Since both conductive and insulating areas are present on the surface of the current collector sheet C, when the insulating area is left unapplied with an electrode material mixture, the possibility of short-circuiting will be greatly reduced. For example, when an electrode material mixture 115 is applied only onto the conductive area 111, the surface of the insulating sheet portion will be exposed in electrode material mixture unapplied portions 121 and 122 as shown in FIGS. 15B and 16B. The exposed portions are insulative and therefore will not serve as the direct cause of short-circuiting. An exposed portion 123 of the conductive sheet portion can be used as a connecting point for connecting to a current collecting terminal.

The conductive sheet portion preferably has a thickness of, for example, 0.5 to 500 μm. As the conductive sheet portion, any electronic conductor that does not cause a chemical change in an assembled battery can be used without limitation. For example, a metal sheet or the like can be used. An ordinary metal sheet having a flat surface can be used. Alternatively, a punched sheet, a lath, a porous sheet, a net, a foam, woven fabric or non-woven fabric may be used. A metal sheet with a rough surface may also be used.

The conductive sheet portion for positive electrode is made of, for example, stainless steel, aluminum, an aluminum alloy, titanium, carbon or the like. Particularly, aluminum and an aluminum alloy are preferred for use. Likewise, the conductive sheet portion for negative electrode is made of, for example, stainless steel, nickel, copper, a copper alloy, titanium or the like. Particularly, copper and a copper alloy are preferred for use. A conductive sheet made of a single material may be used. Alternatively, an alloy sheet or plated sheet produced by combining two or more of the above may also be used.

The conductive sheet portion has a thickness of, for example, 0.5 to 500 μm. As the insulating sheet portion, for example, a resin sheet can be used. An ordinary resin sheet having a flat surface may be used. Alternatively, a punched sheet, a lath, a porous sheet, a net, a foam, woven fabric or non-woven fabric may be used. A resin sheet with a rough surface may also be used.

Examples of the resin used for the resin sheet include: olefin polymers such as polyethylene, polypropylene and polymethylpentene; ester polymers such as polyethylene terephthalate, polybutylene terephthalate, polycyclohexylene dimethylene terephthalate and polyarylate; thioether polymers such as polyphenylene sulfide; aromatic vinyl polymers such as polystyrene; nitrogen-containing polymers such as polyimide and aramid resin; fluorocarbon polymers such as polytetrafluoroethylene and polyvinylidene fluoride. They may be used singly. Alternatively, a copolymer, a polymer alloy or a polymer blend produced by combining two or more of the above can also be used.

The method for connecting the conductive sheet portion and the insulating sheet portion is not specifically limited. For example, they can be connected by welding the edge of the insulating sheet to the edge of the conductive sheet. Alternatively, the edge of the insulating sheet may be attached to the edge of the conductive sheet with an adhesive.

Embodiment 6

Another embodiment of the current collector sheet C (current collector sheet C') will now be described.

Figure 17:
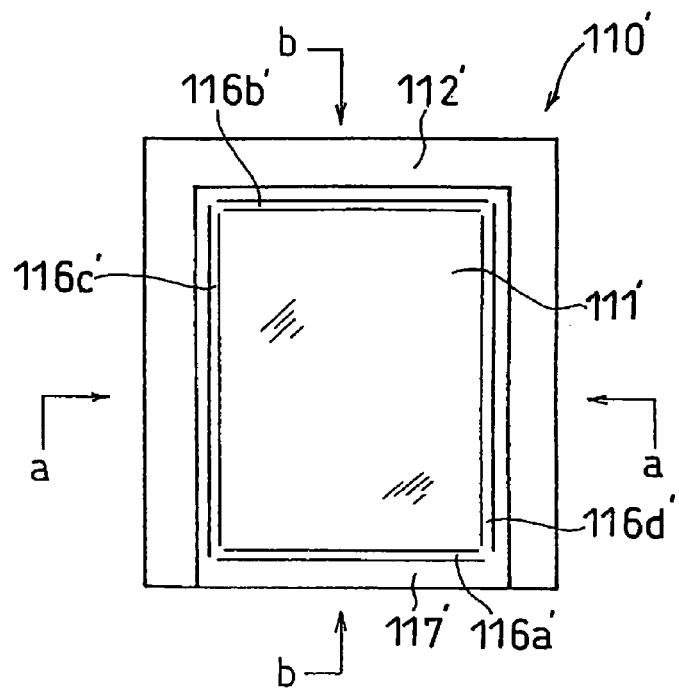
FIG. 17 is a top plan view of a current collector sheet C' according to Embodiment 6 of the present invention.
Figure 18A:
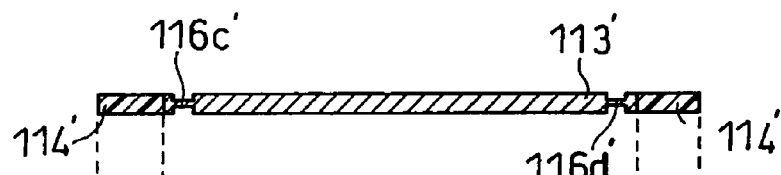
FIG. 18A is a cross sectional view taken on line a-a of FIG. 17 of the current collector sheet C'.

FIG. 17 is a top plan view of a current collector sheet C'110'. FIG. 18A is a cross sectional view taken on line a-a of FIG. 17 of the current collector sheet C'. FIG. 19A is a cross sectional view taken on line b-b of FIG. 17 of the current collector sheet C'.

The current collector sheet C' comprises a conductive sheet portion 113' and an insulating sheet portion 114' positioned flush with each other. The surface of the conductive sheet portion 113' serves as the conductive area 111', and the surface of the insulating sheet portion 114' serves as the insulating area 112'.

Figure 18B:
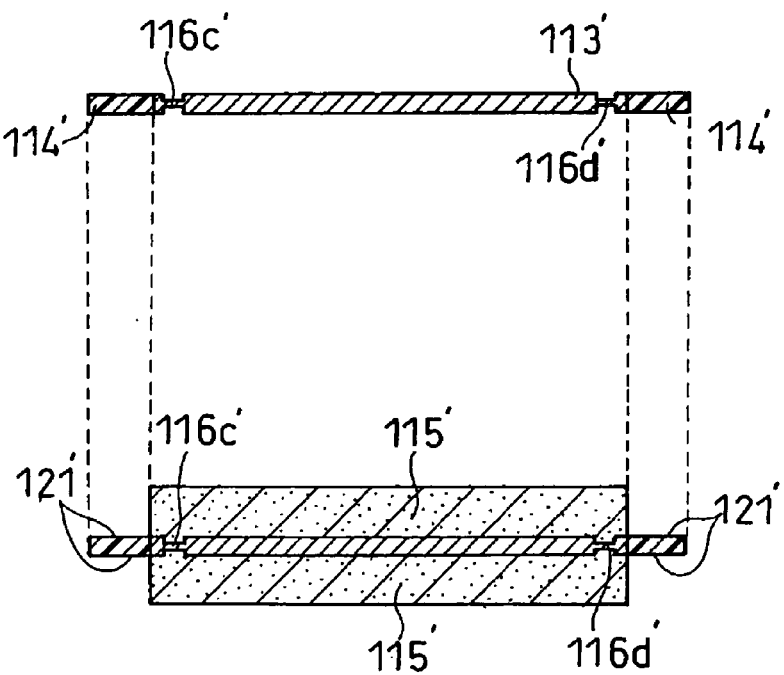
FIG. 18B is a cross sectional view taken on line a-a of FIG. 17 of the current collector sheet C' when an electrode material mixture is applied onto the conductive area thereof.

For example, when an electrode material mixture 115' is applied only onto the conductive area 111', the surface of the insulating sheet portion will be exposed in electrode material mixture unapplied portions 121' and 122' as shown in FIGS. 18B and 19B. The exposed portions are insulative and therefore will not serve as the direct cause of short-circuiting.

The edge of the conductive sheet portion 113' where the insulating sheet portion is not disposed serves as a connecting point 117' of the current collector sheet C' for connecting to a current collecting terminal. Slightly away from the aforesaid edge of the conductive sheet 113' is formed a groove-like thin portion 116a' formed vertical to the current collecting direction. The thin portion 116a' functions as an overcurrent shutdown unit, similar to the current collector sheet B'.

As shown in FIG. 17, the main portion of the conductive area 111' carrying the electrode material mixture may be surrounded by thin portions 116b', 116c' and 116d' in addition to the thin portion 116a'.

Similar to the current collector sheet B', the thin portions 116a' to 116d' preferably have a thickness "c" of not less than 3% of the thickness "C" of the main portion of the conductive sheet 113', more preferably not less than 5% and not greater than 10%.

Embodiment 7

In this embodiment, a description will be given of an electrochemical device having a stack type electrode assembly with the use of the current collector sheet A as an example.

Figure 20:
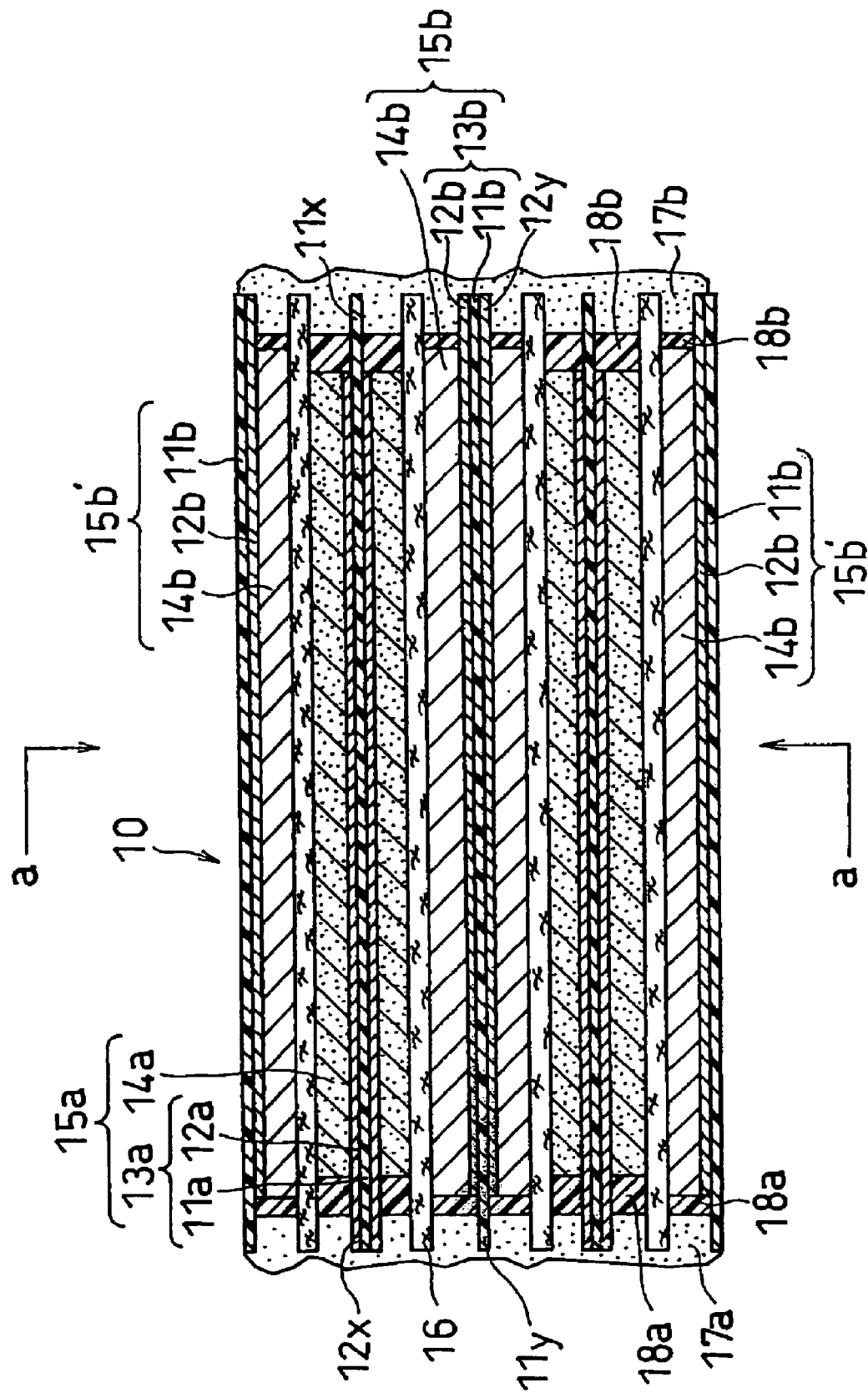
FIG. 20 is a vertical cross-sectional view of a stack type electrode assembly according to Embodiment 7 of the present invention.

FIG. 20 is a cross sectional view of a stack type electrode assembly of an electrochemical device according to this embodiment. FIG. 21 is a cross sectional view taken on line a-a of the electrode assembly. An electrode assembly 10 comprises a plurality of first electrodes 15a and a plurality of second electrodes 15b which are alternately stacked. Between the first electrode 15a and the second electrode 15 b is placed a separator 16.

The first electrode 15a comprises a first current collector sheet 13a and two first electrode material mixture layers 14a. The first current collector sheet 13a comprises a resin sheet 11a and a conductive layer 12a with a predetermined pattern formed on each surface of the resin sheet 11a. The surface of the conductive layer 12a serves as the conductive area of the first current collector sheet, and an exposed portion of the resin sheet 11a serves as the insulating area.

The conductive layer 12a is formed on the entire surface except edges 11x, 11x' and 11x" of the first current collector sheet. The surface of the conductive layer 12a serves as the conductive area and therefore a first electrode material mixture layer 14a is formed thereon. The edges 11x, 11x' and 11x" of the first current collector sheet not having the conductive layer 12a thereon serve as the insulating area. At an edge 12x located opposite to the edge 11x, the conductive layer 12a to be used for current collecting is left exposed.

The electrode assembly 10 includes two types of second electrodes: 15b and 15b'. An internal second electrode 15b sandwiched by two first electrodes 15a has a structure identical to that of the first electrode 15a except that the placement thereof is reversed in the electrode assembly. More specifically, the internal second electrode 15b comprises a second current collector sheet 13b and two second electrode material mixture layers 14b. The second current collector sheet 13b comprises a resin sheet 11b and a conductive layer 12b with a predetermined pattern formed on each surface of the resin sheet 11b. Two second electrodes 15b' located at the outermost sides have a structure identical to that of the internal second electrode except that the conductive layer 12b and the second electrode material mixture layer 14b are formed not both surfaces of the resin sheet 11b but on one surface thereof.

The conductive layer 12b is formed on the entire surface except edges 11y, 11y' and 11y'" of the second current collector sheet. The surface of the conductive layer 12b serves as the conductive area and therefore a second electrode material mixture layer 14b is formed thereon. The edges 11y, 11y' and 11y'" of the second current collector sheet not having the conductive layer 12b thereon serve as the insulating area. At an edge 12y located opposite to the edge 11y, the conductive layer 12b to be used for current collecting is left exposed.

In FIGS. 20 and 21, at each side face of the electrode assembly 10, the edges of the current collector sheets and the edges of the separators are alternately placed.

The exposed portion (edge 12x) of the conductive layer 12a of the first current collector sheet 13a is disposed at the first side face of the electrode assembly 10 (on the left of FIG. 20). The insulating area (edge 11x) located opposite to the edge 12x is disposed at the second side face of the electrode assembly 10 (on the right of FIG. 20). On the other hand, the exposed portion (edge 12y) of the conductive layer 12b of the second current collector sheet 13b is disposed at the second side face of the electrode assembly 10, and the insulating area (edge 11y) located opposite to the edge 12y is disposed at the first side face of the electrode assembly 10. Although, in FIG. 20, the first side face and the second side face are located opposite each other in the electrode assembly, the placement thereof is not specifically limited.

Since the orientations of first electrode and the second electrode are reversed to each other as described above, the exposed portion (edge 12x) of the conductive layer 12a of the first current collector sheet 13a is adjacent to the insulating area (edge 11y) of the second current collector sheet 13b with the edge of the separator 16 interposed therebetween. The exposed portion (edge 12y) of the conductive layer 12b of the second current collector sheet 13b is adjacent to the insulating area (edge 11x) of the first current collector sheet 13a with the edge of the separator 16 interposed therebetween. The placement thus described makes it easy to prevent short-circuiting between the first and second electrodes. It is also easy to give a high-capacity electrode assembly by connecting in parallel the exposed portions of the conductive layers of a plurality of the first or second current collector sheets. In order to ensure the prevention of short-circuiting, the insulating area (edge 11y) of the second current collector sheet adjacent to the exposed portion (edge 12x) of the conductive layer 12a of the first current collector sheet 13a and the insulating area (edge 11x) of the first current collector sheet 13a adjacent to the exposed portion (edge 12y) of the conductive layer 12b of the second current collector sheet 13b preferably have a width of not less than 0.001 mm, more preferably not less than 0.1 mm.

When the exposed portions of the conductive layers 12a of a plurality of the first current collector sheets 13a or the exposed portions of the conductive layers 12b of a plurality of the second current collector sheets 13b are connected in parallel to give a high-capacity electrode assembly as shown in FIG. 20, the exposed portions may be connected by any method. For example, a method in which the first and second side faces are covered with a film made of a conductive material can be used. A thickness of, for example, about 0.01 to 1 mm is sufficient for the film made of a conductive material. The films of a conductive material thus obtained can be utilized for current collecting as a first terminal 17a and a second terminal 17b. In order to have a good condition for collecting currents, the larger the contact area between the film of a conductive material and the exposed portions of the conductive layers 12a or 12b is, the more preferred it is. It is further preferred that the exposed portions of the conductive layers 12a or 12b be embedded to a depth of 0.001 to 1 mm into the film (terminal 17a or 17b) of a conductive material.

In FIGS. 20 and 21, the edges of the first electrode material mixture layers 14a and those of the second electrode material mixture layers 14b are recessed from the third and fourth side faces, but the edges of the electrode material mixture layers may be flush with the edges of the insulating areas of the current collector sheets and the edges of the separators. Even such structure can sufficiently prevent short-circuiting by covering the third and fourth side faces with an insulating material.

In the electrode assembly 10, the edges of the separators and those of the electrode plates are not sticking out of the side faces thereof, and therefore its volumetric efficiency is high and a high capacity can be obtained. Moreover, the electrode assembly like this has a simple and balanced structure so that reliability is likely to be ensured. In addition to that, such electrode assembly can be mass-produced at a time so that the reduction of production costs can be achieved.

The first side face of the electrode assembly 10 may be provided with first insulating material portions 18a for insulating the first terminal 17a from the second electrodes 15b and 15b'. The second side face thereof may be provided with second insulating material portions 18b for insulating the second terminal 17b from the first electrode 15a. Since the insulating area (edge 11y) of the second current collector sheet 13b is positioned at the first side face, and the insulating area (edge 11x) of the first current collector sheet 13a is positioned at the second side face, short-circuiting can be prevented without providing additional insulating material portions. By providing additional insulating material portions 18a and 18b, however, the possibility of short-circuiting will be greatly reduced. The thickness of the insulating material portions 18a and 18b is not specifically limited, but preferred is not less than 0.001 mm, more preferably not less than 0.01 mm.

The method for forming the insulating material portions 18a and 18b is not specifically limited. There can be employed a method in which an insulating material in the form of a paste or liquid is applied to the edges of the electrode material mixture layer 14a on the current collector sheet 13a and the edges of the electrode material mixture layer 14b on the current collector sheet 13b by a screen printing method during production process of the electrode plates. The insulating material portion can also be formed by affixing an insulating material in the form of a film or tape onto the edges of the electrode material mixture layer 14a on the current collector sheet 13a and the edges of the electrode material mixture layer 14b on the current collector sheet 13b. Although, in FIG. 21, the insulating material portions are not formed at the third and fourth side faces of the electrode assembly 10, these side faces may be provided with the insulating material portions.

Examples of the insulating material used for the insulating material portions 18a and 18b include resin, glass compositions and ceramics. A composite prepared by impregnating fabric or non-woven fabric with resin can also be used. The resin may be a thermoplastic resin. Alternatively, a thermosetting resin may be used. When a thermosetting resin is used, a curing process of heating a coating film made of resin will be required.

Examples of the resin that can be used for the insulating material portions 18a and 18b include: olefin polymers such as polyethylene, polypropylene and polymethylpentene; ester polymers such as polyethylene terephthalate, polybutylene terephthalate, polycyclohexylene dimethylene terephthalate, polyarylate and polycarbonate; ether polymers such as polyethylene oxide, polypropylene oxide, polyacetal, polyphenylene ether, polyether ether ketone and polyether imide; sulfone polymers such as polysulfone and polyethersulfone; acrylonitrile polymers such as polyacrylonitrile, AS resin and ABS resin; thioether polymers such as polyphenylene sulfide; aromatic vinyle polymers such as polystyrene; nitrogen-containing polymers such as polyimide and aramid resin; fluorocarbon polymers such as polytetrafluoroethylene and polyvinylidene fluoride; acrylic polymers such as polymethyl methacrylate. They may be used singly. Alternatively, a copolymer, a polymer alloy or a polymer blend produced by combining two or more of the above may also be used. A polymer obtained through polymerizing and hardening by heating or UV irradiation may be used.

In FIG. 20, the second electrode material mixture layer 14b has a larger area than the first electrode material mixture layer 14a. Such structure is suitable for an electrode assembly of a lithium ion secondary battery employing the first electrode material mixture layer 14a as the positive electrode and the second electrode material mixture layer 14b as the negative electrode. In the case where the first electrode material mixture layer 14a is used as the negative electrode and the second electrode material mixture layer 14b is used as the positive electrode, the first electrode material mixture layer 14a should have a larger area than the second electrode material mixture layer 14b.

The electrode material mixture layers 14a and 14b have a thickness of, for example, 1 to 1000 μm, but the thickness thereof is not specifically limited.

The electrode assembly is housed in a case having a predetermined shape with a predetermined electrolyte where appropriate. As the case, there can be used, for example, a stainless steel plate or aluminum plate formed into a predetermined shape, an aluminum foil having resin films on both surfaces thereof (aluminum laminate sheet), and a resin case.

The composition of the electrolyte housed with the electrode assembly in the case varies according to the type of electrochemical device. In the case of the electrochemical device being, for example, a lithium ion secondary battery, an electrolyte prepared by dissolving a lithium salt in a non-aqueous solvent is used. The concentration of the lithium salt in the electrolyte is, for example, 0.5 to 1.5 mol/L.

Examples of the non-aqueous electrolyte for use include: cyclic carbonates such as ethylene carbonate, propylene carbonate, butylene carbonate and vinylene carbonate; non-cyclic carbonates such as dimethyl carbonate, diethyl carbonate, ethyl methyl carbonate, ethyl propyl carbonate, methyl propyl carbonate, methyl isopropyl carbonate and dipropyl carbonate; aliphatic carboxylic acid esters such as methyl formate, methyl acetate, methyl propionate, ethyl propionate; ?-lactones such as ?-butyrolactone and ?-valerolactone; non-cyclic ethers such as 1,2-dimethoxyethane, 1,2-diethoxyethane and ethoxymethoxyethane; cyclic ethers such as tetrahydrofuran and 2-methyl-tetrahydrofuran; alkyl phosphoric acid esters such as dimethyl sulfoxide, 1,3-dioxolane, trimethyl phosphate, triethyl phosphate and trioctyl phosphate; and fluorides thereof. It is preferred to use a combination of a plurality of the above. In particular, a mixture containing a cyclic carbonate and a non-cyclic carbonate and a mixture containing a cyclic carbonate, non-cyclic carbonate and an aliphatic carboxylic acid ester are preferred.

Examples of the lithium salt include: $LiPF_6$, $LiBF_4$, $LiClO_4$, $LiAlCl_4$, $LiSbF_6$, $LiSCN$, $LiCl$, $LiCF_3SO_3$, $LiCF_3CO_2$, $LIAsF_6$, $LiN(CF_3SO_2)_2$, $Li_2B_{10}Cl_{10}$, $LiN(C_2F_5SO_2)_2$, $LiPF_3(CF_3)_3$ and $LiPF_3(C_2F_5)_3$. They may be used singly or in combination of two or more, but preferably at least $LiPF_6$ is used.

Embodiment 8

Figure 23:
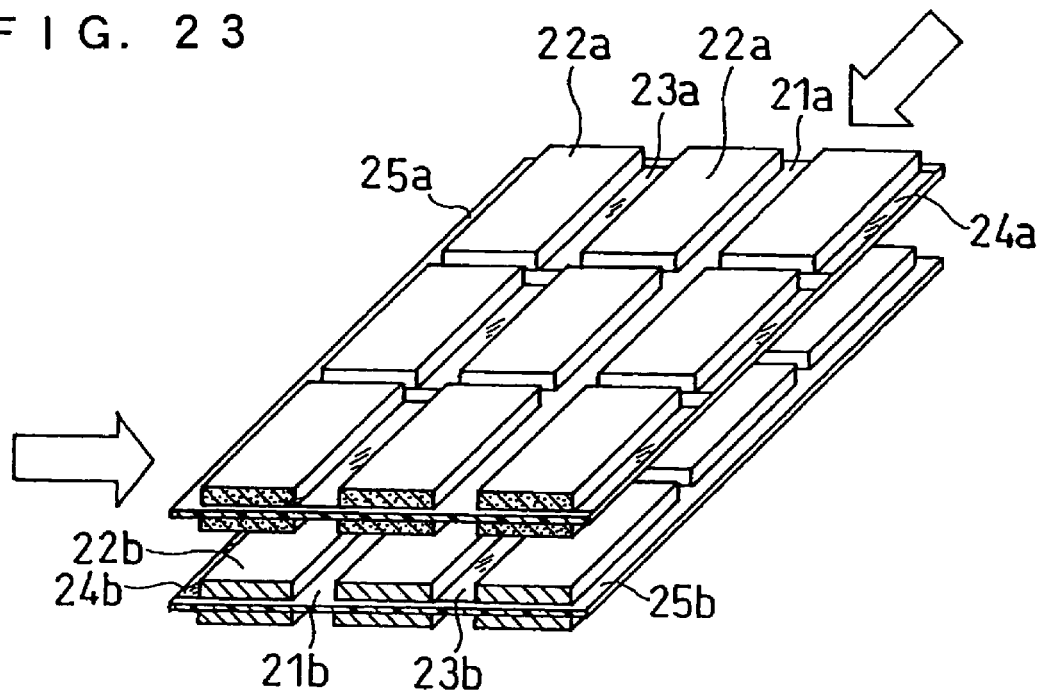
FIG. 23 is a perspective view of a group of first electrodes and a group of second electrodes according to Embodiment 8 of the present invention.

In this embodiment, a method for simultaneously producing a plurality of stack type electrode assemblies with the use of the current collector sheet A as an example will be described referring to FIGS. 22 to 23.

(1) Production of First Electrode

A resin sheet 21a large enough to provide a desired number of current collector sheets is prepared. Then, a plurality of conductive layers of a predetermined pattern are formed in the same position of each surface of the resin sheet 21a. For example, as shown in FIG. 22, conductive layers 26a with a predetermined shape are formed in a plurality of rows and a plurality of columns on the resin sheet 21a. The conductive layers 26a are prepared by, for example, covering the resin sheet 21a with a mask having openings in a matrix-like arrangement and depositing a metal on the portions of the resin sheet exposed through the openings.

A plurality of conductive layers 26a, each of which is as large as two electrodes, are formed on the resin sheet 21a. Specifically, when 2n electrodes are necessary, n conductive layers 26a are formed on each surface of the resin sheet 21a. Subsequently, as shown in FIG. 23, first electrode material mixture layers 22a are formed on the conductive layers 26a such that two first electrode material mixture layers 22a are placed on each conductive layer 26a. Between the two first electrode material mixture layers 22a is left an exposed portion 23a of the conductive layer 26a not having the first electrode material mixture thereon. Although FIG. 23 shows the electrode material mixture layers arranged in three rows and three columns, typically, more conductive layers and more first electrode material layers are formed on a larger current collector sheet.

The first electrode material mixture layers 22a are formed by applying a first electrode material mixture paste onto the entire surface of the conductive layer 26a except the center portion thereof. The application method is not specifically limited, and screen printing and pattern printing can be employed. The exposed portion 23a of the conductive layer with the paste not applied thereon serves as a connecting point 24a for connecting to a first terminal after the assembly of the electrode assembly.

The first electrode material mixture is prepared by mixing a first electrode active material, a conductive material and a binder with a dispersing medium. The density of the material mixture can be enhanced by drying a coating film made of the paste, which is then rolled by rollers.

In the case where the first electrode is a positive electrode for a lithium-ion secondary battery, as the active material, for example, a lithium-containing transition metal oxide is preferably used. Examples of the lithium-containing transition metal oxide include $Li_xCoO_z$, $Li_xNiO_z$, $Li_xMnO_z$, $Li_xCo_yNi_{1-y}O_z$, $Li_xCo_yV_{1-y}O_z$, $Li_xNi_{1-y}M_yO_z$ (M=Ti, V, Mn, Fe), $Li_xCO_aNi_bM_cO_z$ (M=Ti, Mn, Al, Mg, Fe, Zr), $Li_xMn_2O_4$, $Li_xMn_{2(1-y)}M_{2y}O_4$ (M=Na, Mg, Sc, Y, Fe, Co, Ni, Ti, Zr, Cu, Zn, Al, Pb, Sb), where x varies in the range of $0 \leq x \leq 1.2$ according to charge/discharge of the battery, $0 \leq y \leq 1$, $0.9 \leq f \leq 0.98$, $1.9 \leq z \leq 2.3$, a+b+c=1, $0 \leq a \leq 1$, $0 \leq b \leq 1$, $0 \leq c \leq 1$. They may be used singly or in combination of two or more.

In the case where the first electrode is a negative electrode for a lithium-ion secondary battery, as the active material, there can be used, for example, lithium, a lithium alloy, an intermetallic compound, a carbon material, an organic or inorganic compound capable of absorbing and desorbing lithium ions, a metal complex and an organic polymer compound. They may be used singly or in combination of two or more. Examples of the carbon material include coke, thermally decomposed carbon, natural graphite, artificial graphite, mesocarbon microbeads, graphitized mesophase microspheres, vapor-deposited carbon, glassy carbon, carbon fiber (polyacrylonitrile-based, pitch-based, cellulose-based, vapor phase growth-based), amorphous carbon and baked organic polymer compound. Among them, particularly preferred are natural graphite and artificial graphite.

As the conductive material, carbon black such as acetylene black and graphite are used, for example. As the binder, there can be used, for example, fluorocarbon resins such as polyvinylidene fluoride and polytetrafluoroethylene, acrylic resins, styrene butadiene rubber and ethylene-propylene terpolymer.

An insulating material is applied along the edge of the first electrode material mixture layer 22a to be adjacent to the exposed portion of the conductive layer of the second current collector sheet in the electrode assembly, that is, along the edge of the first electrode material mixture layer 22a to be positioned at the second side face in the electrode assembly. In this case also, it is preferred to perform pattern application. Such application of an insulating material is optional and not always necessary, but the application of an insulating material reduces the possibility of short-circuiting. The applied insulating material forms a first insulating material portion in the electrode assembly. The edges of the first electrode material mixture layer 22a to be positioned at the third and fourth side faces respectively may be covered with the insulating material.

(2) Production of Second Electrode

A second electrode having a second electrode material mixture layer on each surface thereof can be produced by a method analogous to that for the first electrode. More specifically, a plurality of conductive layers of a predetermined pattern are formed in the same position of each surface of a resin sheet 21b large enough to provide a desired number of current collector sheets. On each conductive layer are formed two second electrode material mixture layers 22b. Between the two second electrode material mixture layers 22b is left an exposed portion 23b of the conductive layer not having the second electrode material mixture layer thereon. The exposed portion 23b of the conductive layer with the paste not applied thereon serves as a connecting point 24b for connecting to a second terminal in the electrode assembly. Another second electrode having the second electrode material mixture layers 22b only on one surface thereof can be produced in the same manner as above except that the conductive layers, the second electrode material mixture layers and the insulating material are not arranged on the other surface of the second electrode.

(3) Production of Electrode Assembly

The group comprising a plurality of first electrodes and the group comprising a plurality of second electrodes thus produced above are laminated with a separator interposed therebetween. At this time, they are laminated such that the first electrode material mixture layers 22a of the first electrode and the second electrode material mixture layers 22b of the second electrode face each other, and such that the exposed portion 23a of the conductive layer of the first electrode faces the insulating material of the second electrode and that the insulating material of the first electrode faces the exposed portion 23b of the conductive layer of the second electrode. A pair of second electrodes having the second electrode material mixture layers only on one surface thereof are placed at the outermost sides such that they sandwich the internal electrodes therebetween, which is then pressed. In this manner, an assemblage comprising a plurality of electrode plate stacks is obtained.

As the separator, woven fabric and non-woven fabric made of olefin polymer such as polyethylene and polypropylene or of glass fiber can be used. A solid electrolyte or a gel electrolyte can also be used as the separator. As the solid electrolyte, for example, polyethylene oxide and polypropylene oxide can be used as a matrix material. The gel electrolyte is prepared by, for example, impregnating a matrix made of a polymer material with a non-aqueous electrolyte which will be described later. As the polymer material for forming the matrix, there can be used polyethylene oxide, polypropylene oxide, polyvinylidene fluoride and a copolymer of vinylidene fluoride and hexafluoropropylene. They may be used singly or in combination of two or more. Among them, particularly preferred are a copolymer of vinylidene fluoride and hexafluoropropylene and a mixture of polyvinylidene fluoride and polyethylene oxide.

The assemblage comprising a plurality of electrode plate stacks is divided into respective electrode plate stacks. The first and second electrodes are cut along the directions indicated by the arrows in FIG. 23. The exposed portions 23a and 23b of the conductive layers respectively form connecting points 24a and 24b for connecting to terminals by the cutting. The exposed portions of the resin sheet located opposite thereto respectively form insulating areas 25a and 25b by the cutting. At four side faces of an electrode plate stack thus obtained, the edges of the current collector sheets and the edges of the separators are almost flush with each other, but the conductive areas of the electrodes of different polarity do not face each other at each of the side faces.

The production of an electrode assembly using a current collector sheet made of a metal foil, which is conventionally used, by the method described above is accompanied by a problem of metal burrs created during cutting. The metal burrs pierce the separator, which serves as a major cause of short-circuiting. For this reason, the prevention of the creation of metal burrs is essential. To cut a metal foil without creating metal burrs is, however, extremely difficult. In the case of using a current collector made of a resin sheet, on the other hand, the cut section thereof is mostly resin so that metal burrs do not occur. Accordingly, reliability of the battery will be greatly improved.

A first terminal is obtained by covering, with a film made of a conductive material, the first side face where the connecting point 24a formed from the exposed portion 23a of the conductive layer of the first current collector sheet and the insulating area 25b of the second current collector sheet are alternately arranged. For example, the first side face can be covered with a metal film by spraying melted or half-melted metal particles to the first side face. The thus-formed metal film is electrically connected to the connecting point 24a of the first current collector sheet automatically. The insulating material is applied to the edge of the second electrode material mixture layer 22b located at the first side face so that short-circuiting between the metal film and the second electrode does not occur. Likewise, by covering, with a metal film, the second side face where the connecting point 24b formed from the exposed portion 23b of the conductive layer of the second current collector sheet and the insulating area 25a of the first current collector sheet are alternately arranged, a second terminal can be obtained.

In the case where the first or second terminal serves as the positive electrode terminal, the metal film is preferably formed by using aluminum. Conversely, in the case where the first or second terminal serves as the negative electrode terminal, the metal film is preferably formed by using copper.

According to the production method described above, it is possible to efficiently produce electrode assemblies with any size as long as they have a size of a length of 1 to 300 mm, a width of 1 to 300 mm and a thickness of 0.01 to 20 mm.

Embodiment 9

In this embodiment, another method for simultaneously producing a plurality of stack type electrode assemblies with the use of the current collector sheet A as an example will be described.

Figure 24:
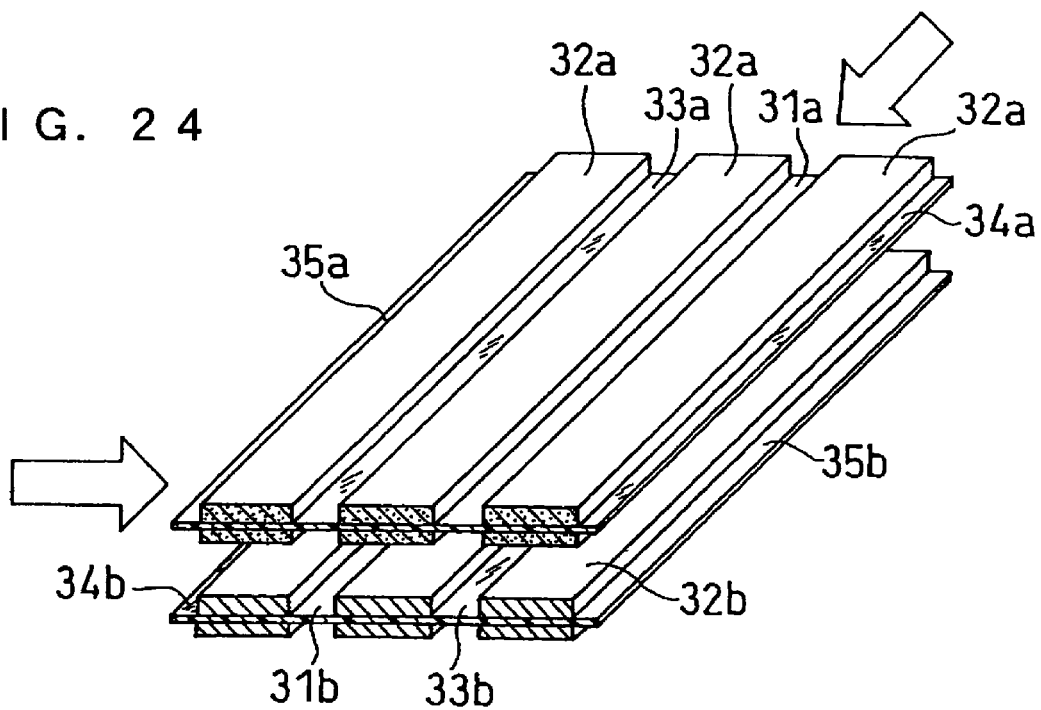
FIG. 24 is a perspective view of a group of first electrodes and a group of second electrodes according to Embodiment 9 of the present invention.

An assemblage composed of a plurality of electrode assemblies can be obtained also by using a group of first electrodes and a group of second electrodes as shown in FIG. 24. In the case of producing a group of first electrodes used therefor, a plurality of strip-shaped conductive layers are formed in the same position of each surface of a resin sheet 31a large enough to provide a desired number of current collector sheets. Such conductive layers can be formed by covering the resin sheet 31a with a mask having strip-shaped openings and vapor-depositing a metal on the portions of resin sheet exposed through the openings. In this case also, a plurality of strip-shaped conductive layers, each of which is as large as two strip-shaped electrode material mixture layers, are formed on the resin sheet 31a. Accordingly, when 2n strip-shaped electrode material mixture layers are necessary, n strip-shaped conductive layers are formed on each surface of the resin sheet 31a.

On each strip-shaped conductive layer are formed two strip-shaped first electrode material mixture layers 32a. Between the two strip-shaped first electrode material mixture layers 32a is left an exposed portion 33a of the conductive layer not having the first electrode material mixture thereon. The strip-shaped first electrode material mixture layer 32a is formed by applying the same first electrode material mixture paste used above onto the entire surface of the conductive layer except the center portion thereof. The application method is the same as used in the case of the stack type electrode assembly. The exposed portion 33a of the conductive layer with the paste not applied thereon serves as a connecting point 34a for connecting to a first terminal.

Likewise, in the case of producing a group of second electrodes, a plurality of strip-shaped conductive layers are formed in the same position of each surface of a resin sheet 31b large enough to provide a desired number of current collector sheets. On each strip-shaped conductive layer are formed two strip-shaped second electrode material mixture layers 32b. Between the two strip-shaped second electrode material mixture layers 32b is left an exposed portion 33b of the conductive layer not having the second electrode material mixture thereon. The exposed portion 33b of the conductive layer serves as a connecting point 34b for connecting to a second terminal.

By cutting the assemblage composed of a plurality of electrode assemblies described above along the directions indicated by the arrows in FIG. 24 and dividing it into respective electrode plate stacks, the exposed portions 33a and 33b of the conductive layers respectively form connecting points 34a and 34b for connecting to terminals by the cutting. The exposed portions of the resin sheet located opposite thereto respectively form insulating areas 35a and 35b by the cutting. At four side faces of an electrode plate stack thus obtained, the edges of the current collector sheets and the edges of the separators are almost flush with each other, but the conductive areas of the electrodes of different polarity do not face each other at the first and second side faces. On the other hand, at the third and fourth side faces, the cross section of the electrode material mixture layers is exposed, but by covering these side faces with an insulating material, the possibility of short-circuiting will be greatly reduced.

According to the production method described above, it is possible to efficiently produce electrode assemblies with any size as long as they have a size of a length of 1 to 300 mm, a width of 1 to 300 mm and a thickness of 0.01 to 20 mm.

Embodiment 10

Figure 25:
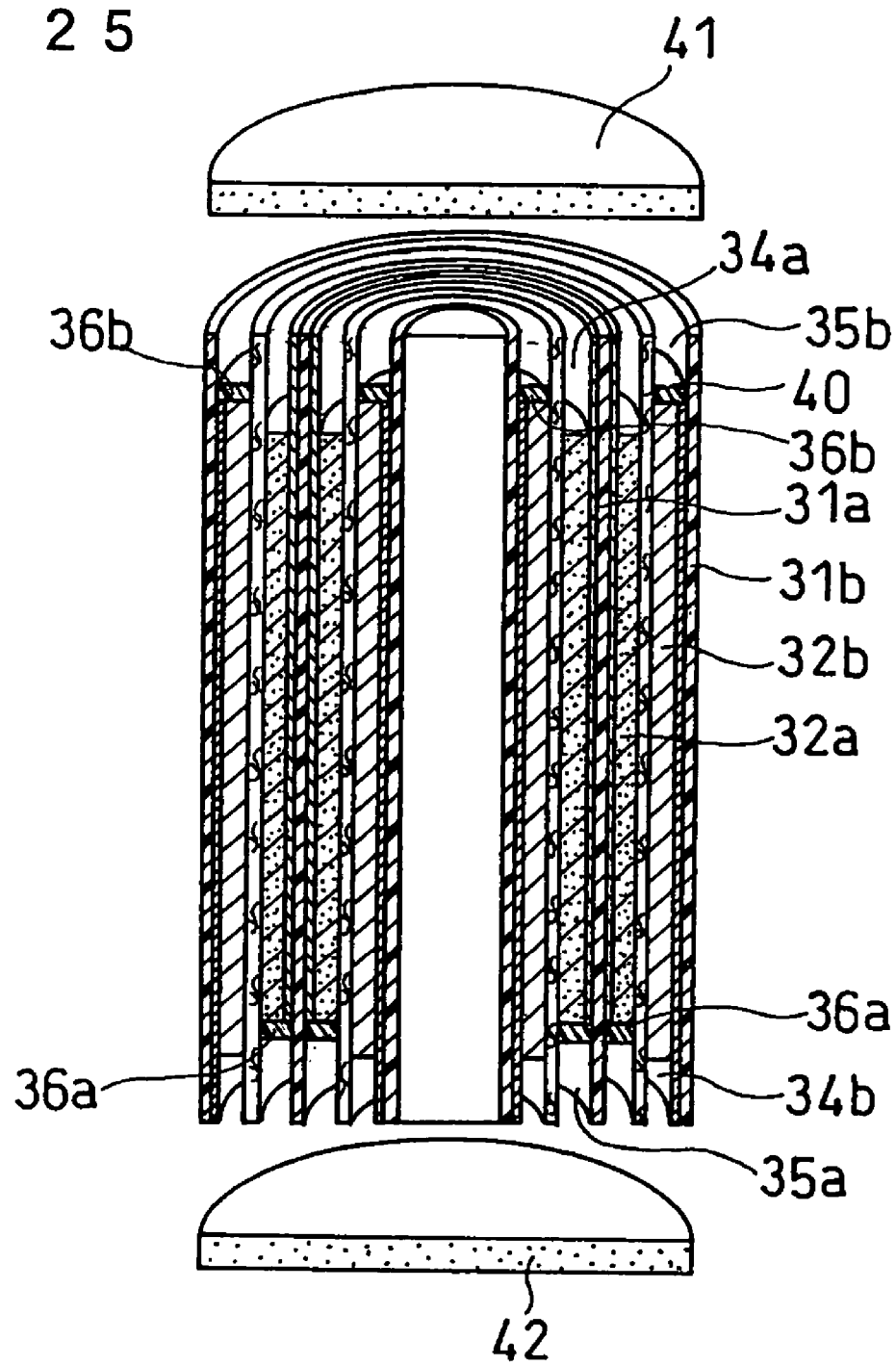
FIG. 25 is a schematic view illustrating, in cross section, the structure of a spiral type electrode assembly according to Embodiment 10 of the present invention, featuring a first electrode.

In this embodiment, a method for simultaneously producing a plurality of spiral type electrode assemblies with the use of the current collector sheet A as an example will be described referring to FIG. 25. FIG. 25 is a schematic cross sectional view of a spiral type electrode assembly, featuring a first electrode, and a material mixture layer and an electrode plate at the outer side are omitted in the diagram.

(1) Production of First Electrode

A first electrode used for a spiral type electrode assembly has a structure identical to that of the first electrode used for a stack type electrode assembly except that the electrode is strip-shaped. Accordingly, the production method for the first electrode is almost the same as in the case of the stack type electrode assembly.

For example, a group of first electrodes analogous to that shown in FIG. 24 is produced. Similar to the above, an insulating material is then applied onto at least the edge opposite to the exposed portion of the conductive layer among the edges of the first electrode material mixture layer. That portion will be adjacent to the exposed portion of the conductive layer of the second current collector sheet in the electrode assembly.

(2) Production of Second Electrode

Likewise, a group of second electrodes analogous to that shown in FIG. 24 is produced here.

(3) Production of Electrode Assembly

The group comprising first electrodes and the group comprising second electrodes are spirally wound with a separator 40 interposed therebetween. At this time, the electrodes are placed such that the strip-shaped first electrode material mixture layers 32a and the strip-shaped second electrode material mixture layers 32b face each other, and such that the exposed portion of the conductive layer of the first electrode faces the insulating material of the second electrode and that the insulating material of the first electrode faces the exposed portion of the conductive layer of the second electrode. As a result, an elongated cylindrical assemblage comprising a plurality of spiral type electrode assemblies in which the orientations of the electrode plates are reversed to each other is obtained.

The elongated cylindrical assemblage is divided into respective electrode assemblies. At one side face (bottom face) of such electrode assembly, the exposed portion of the conductive layer of the first current collector sheet and the insulating area of the second current collector sheet are arranged alternately and concentrically. At the other side face (bottom face) thereof, the exposed portion of the conductive layer of the second current collector sheet and the insulating area of the first current collector sheet are arranged alternately and concentrically.

The bottom face where the exposed portion of the conductive layer of the first current collector sheet is arranged and the bottom face where the exposed portion of the conductive layer of the second current collector sheet is arranged are covered with a metal in the same manner as described above, whereby a first terminal 41 and a second terminal 42 are formed. To the edge of the second electrode material mixture layer 32b is applied an insulating material 36b and therefore short-circuiting between the first terminal 41 and the second electrode does not occur. Likewise, an insulating material 36a is also applied to the edge of the first electrode material mixture layer 32a and therefore short-circuiting between the second terminal 42 and the first electrode does not occur.

Embodiment 11

In this embodiment, a method for simultaneously producing a plurality of stack type electrode assemblies with the use of the current collector sheet A' having a small-width portion as an example will be described.

(1) Production of First Electrode

A resin sheet 21a' large enough to provide a desired number of current collector sheets is prepared. Then, a plurality of strip-shaped conductive layers are formed in the same position of each surface of the resin sheet 21a'. For example, as shown in FIG. 26, the conductive layers 26a' with a predetermined shape are formed in a plurality of rows and a plurality of columns on the resin sheet 21a'.

When 2n electrodes are necessary, n conductive layers 26a' are formed on each surface of the resin sheet 21a'. Subsequently, as shown in FIG. 27, a first electrode material mixture layers 22a' are formed on the conductive layer 26a' such that two first electrode material mixture layers 22a' are placed on each conductive layer 26a'. Between the two first electrode material mixture layers 22a' is left an exposed portion 23a' which is a part of the conductive layer 26a' and does not have the first electrode material mixture thereon.

The first electrode material mixture layers 22a' are formed by applying a first electrode material mixture paste onto the entire surface of the conductive layer 26a' except the center portion thereof. The exposed portion 23a' of the conductive layer with the paste not applied thereon serves as a connecting point 24a' for connecting to a first terminal after the assembly of the electrode assembly.

In this case also, an insulating material is preferably applied along the edge of the first electrode material mixture layer 22a' to be adjacent to the exposed portion of the conductive layer of the second current collector sheet in the electrode assembly, that is, along the edge of the first electrode material mixture layer 22a' to be positioned at the second side face in the electrode assembly.

(2) Production of Second Electrode

A plurality of strip-shaped conductive layers of a predetermined pattern are formed in the same position of each surface of a resin sheet 21b' large enough to provide a desired number of current collector sheets. On each conductive layer are formed two second electrode material mixture layers 22b'. Between the two second electrode material mixture layers 22b' is left an exposed portion 23b' of the conductive layer not having the second electrode material mixture layer thereon. The exposed portion 23b' of the conductive layer with the paste not applied thereon serves as a connecting point 24b' for connecting to a second terminal in the electrode assembly. Another second electrode having the second electrode material mixture layers 22b' only on one surface thereof can be produced in the same manner as above except that the conductive layers, the second electrode material mixture layers and the insulating material are not arranged on the other surface of the second electrode.

(3) Production of Electrode Assembly

Next, the group comprising a plurality of first electrodes and the group comprising a plurality of second electrodes thus produced above are laminated with a separator interposed therebetween. A pair of the second electrodes having the second electrode material mixture layers 22b' only on one surface thereof are placed at the outermost sides such that they sandwich the internal electrodes therebetween, which is then pressed. An assemblage comprising a plurality of electrode plate stacks obtained in the above manner is divided into respective electrode plate stacks. The first and second electrodes are cut along the directions indicated by the arrows in FIG. 27. The exposed portions 23a' and 23b' of the conductive layers respectively form connecting points 24a' and 24b' for connecting to terminals by the cutting. The exposed portions of the resin sheet located opposite thereto respectively form insulating areas 25a' and 25b' by the cutting. A portion of the conductive layer between the connecting point 24a' or 24b' and the main portion of the conductive layer carrying the electrode material mixture layer thereon is formed to have a small width. These small-width portions 27a' and 27b' function as overcurrent shutdown units. Accordingly, even if short-circuiting occurs and a current greater than normal passes through the small-width portion, the small-width portion of the conductive layer melts to block an overcurrent.

A first terminal is obtained by covering, with a film made of a conductive material, the first side face where the connecting point 24a' formed from the exposed portion 23a' of the conductive layer of the first current collector sheet and the insulating area 25b' of the second current collector sheet are alternately arranged.

Embodiment 12

In this embodiment, another method for simultaneously producing a plurality of stack type electrode assemblies with the use of the current collector sheet A' having a small-width portion as an example will be described.

Figure 29:
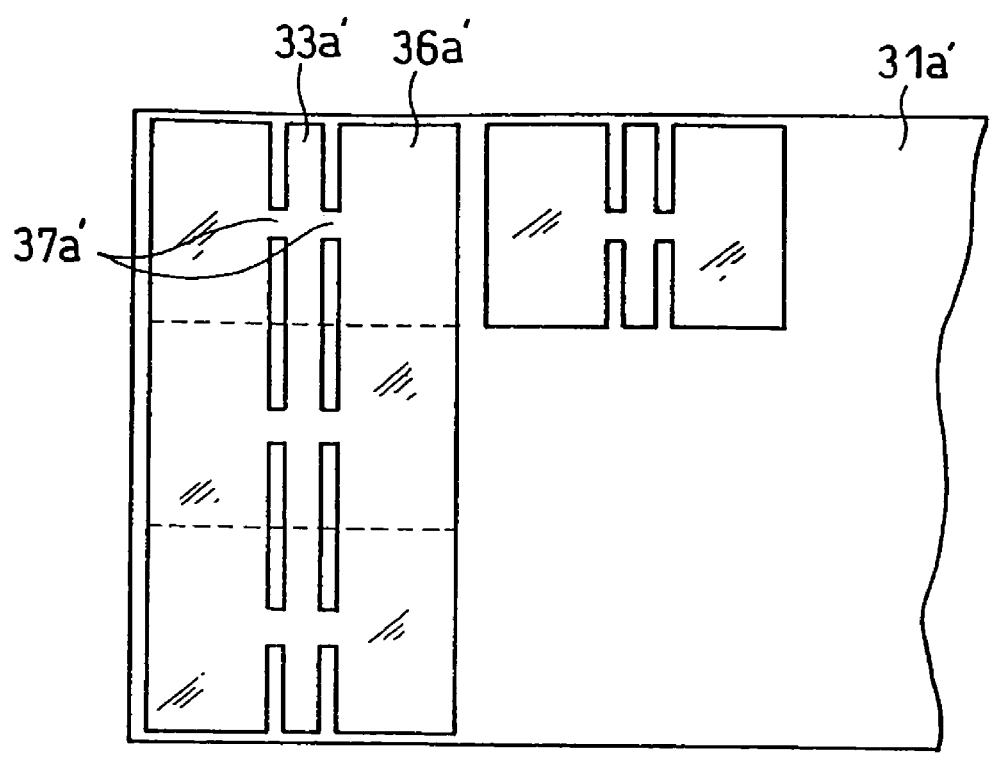
FIG. 29 is a diagram showing a process of forming a conductive layer having a small-width portion on a resin sheet according to Embodiment 12 of the present invention.

An assemblage composed of a plurality of electrode assemblies can be obtained also by using a group of first electrodes and a group of second electrodes as shown in FIG. 28. In the case of producing a group comprising the first electrodes, conductive layers 36a' as shown in FIG. 29 are formed in the same position of each surface of a resin sheet 31a' large enough to provide a desired number of current collector sheets. Such conductive layers can be formed by covering the resin sheet 31a' with a mask having predetermined openings and vapor-depositing a metal on the portions of resin sheet exposed through the openings. In this case also, when 2n strip-shaped electrode material mixture layers are necessary, n strip-shaped conductive layers 36a' are formed on each surface of the resin sheet 31a'.

On each strip-shaped conductive layer are formed two strip-shaped first electrode material mixture layers 32a'. Between the two strip-shaped first electrode material mixture layers 32a' is left an exposed portion 33a' of the conductive layer not having the first electrode material mixture layer thereon. The exposed portion 33a' of the conductive layer with the paste not applied thereon serves as a connecting point 34a for connecting to a first terminal.

Likewise, in the case of producing a group of second electrodes, conductive layers as shown in FIG. 29 are formed in the same position of each surface of a resin sheet 31b' large enough to provide a desired number of current collector sheets. On each conductive layer are formed two strip-shaped second electrode material mixture layers 32b'. Between the two strip-shaped second electrode material mixture layers 32b' is left an exposed portion 33b' of the conductive layer not having the second electrode material mixture thereon. The exposed portion 33b' of the conductive layer serves as a connecting point 34b' for connecting to a second terminal.

By cutting the assemblage composed of a plurality of electrode assemblies described above along the directions indicated by the arrows in FIG. 28 and dividing it into respective electrode plate stacks, the exposed portions 33a' and 33b' of the conductive layers respectively form connecting points 34a' and 34b' for connecting to terminals. The exposed portions of the resin sheet located opposite thereto respectively form insulating areas 35a' and 35b' by the cutting. A portion of the conductive layer between the connecting point 34a' or 34b' and the main portion of the conductive layer carrying the electrode material mixture layer thereon is formed to have a small width. These small-width portions 37a' and 37b' function as overcurrent shutdown units.

Embodiment 13

Figure 30:
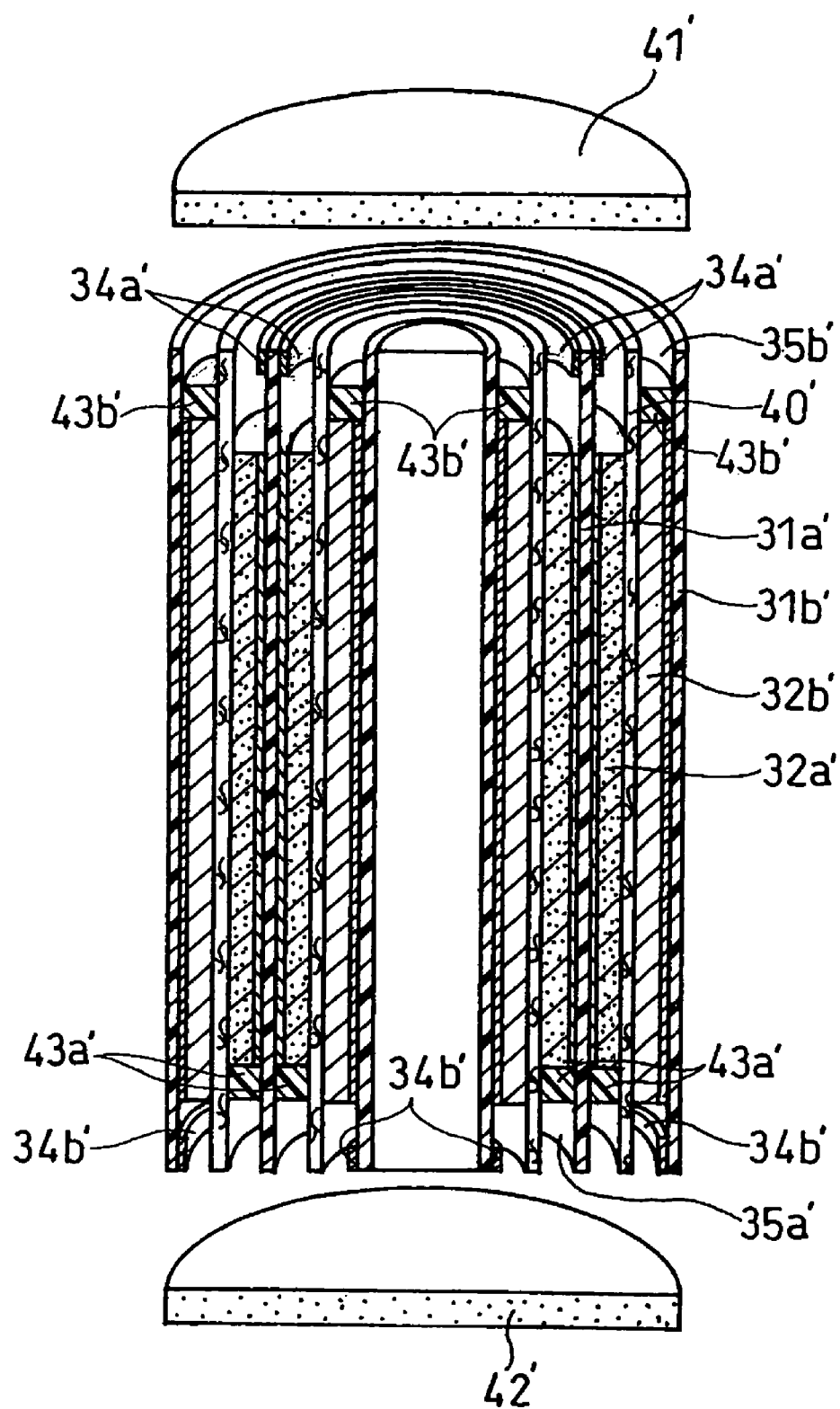
FIG. 30 is a schematic view illustrating, in cross section, the structure of a spiral type electrode assembly according to Embodiment 13 of the present invention, featuring a first electrode.

In this embodiment, a method for simultaneously producing a plurality of spiral type electrode assemblies with the use of the current collector sheet A' having a small-width portion as an example will be described referring to FIG. 30. FIG. 30 is a schematic cross sectional view of a spiral type electrode assembly, featuring a first electrode, and a material mixture layer and an electrode plate at the outer side are omitted in the diagram.

(1) Production of First Electrode

As an example, a group of first electrodes analogous to the one shown in FIG. 28 is produced. Similar to the above, an insulating material is then applied onto at least the edge opposite to the exposed portion of the conductive layer among the edges of the first electrode material mixture layer.

(2) Production of Second Electrode

Likewise, a group of second electrodes analogous to the one shown in FIG. 28 is produced here.

(3) Production of Electrode Assembly

The group comprising first electrodes and the group comprising second electrodes are spirally wound with a separator 40' interposed therebetween. At this time, the electrodes are placed such that the strip-shaped first electrode material mixture layers 32a' and the strip-shaped second electrode material mixture layers 32b' face each other. Further, the electrode plates are placed such that the exposed portion of the conductive layer of the first electrode faces the insulating material of the second electrode and that the insulating material of the first electrode faces the exposed portion of the conductive layer of the second electrode. As a result, an elongated cylindrical assemblage comprising a plurality of spiral type electrode assemblies in which the orientations of the electrode plates are reversed to each other is obtained.

The elongated cylindrical assemblage is divided into respective electrode assemblies. Although not seen in FIG. 30, a plurality of small-width portions are formed in the conductive layers, each of the small-width portions being formed between the exposed portion and the portion carrying the electrode material mixture layer thereon, which function as overcurrent shutdown units.

The bottom face where the exposed portion of the conductive layer of the first current collector sheet is arranged and the bottom face where the exposed portion of the conductive layer of the second current collector sheet is arranged are covered with a metal in the same manner as described above, whereby a first terminal 41' and a second terminal 42' are formed. To the edge of the second electrode material mixture layer 32b' is applied an insulating material 43b' and therefore short-circuiting between the first terminal 41' and the second electrode does not occur. Likewise, an insulating material 43a' is also applied to the edges of the first electrode material mixture layer 32a' and therefore short-circuiting between the second terminal 42' and the first electrode does not occur. Even if short-circuiting occurs and a current greater than normal passes through the small-width portions, the plurality of small-width portions melt to block an overcurrent.

Embodiment 14

In this embodiment, a preferred example of a bipolar electrode will be described.

Figure 31A:
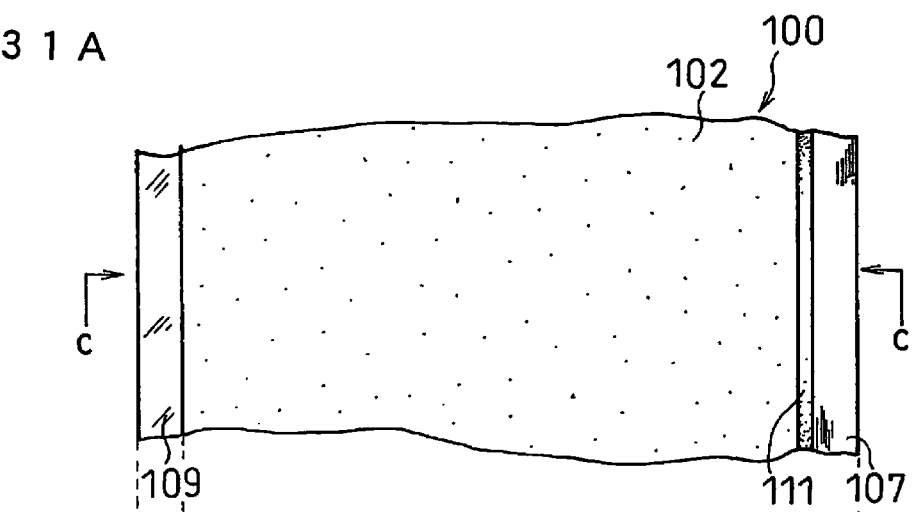
FIG. 31A is a top plan view of a bipolar electrode according to Embodiment 14 of the present invention.
Figure 31B:
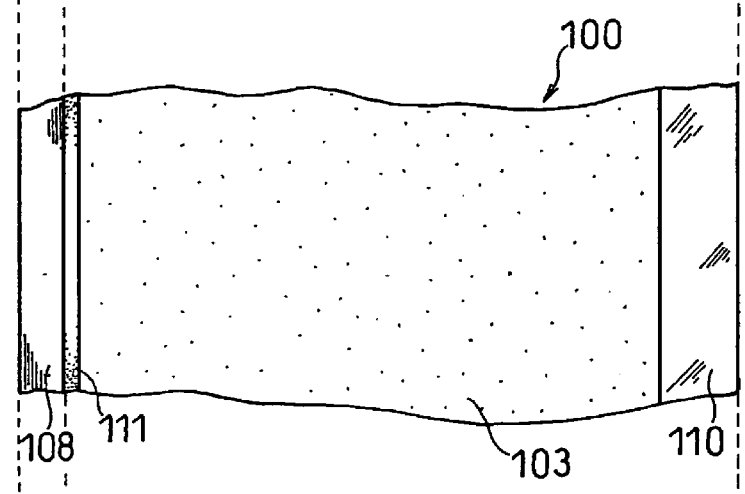
FIG. 31B is a rear view of the bipolar electrode.
Figure 31C:
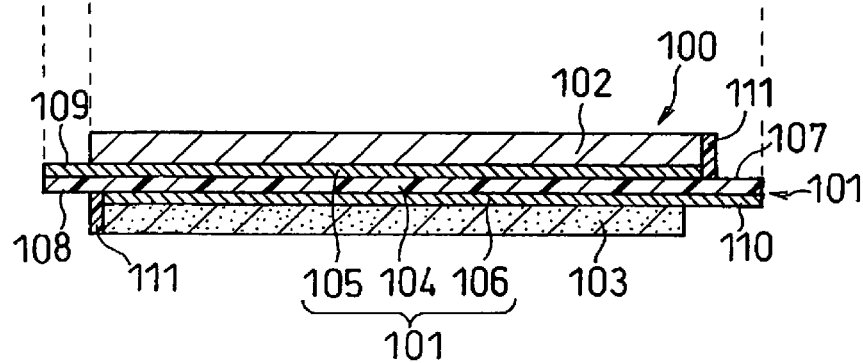
FIG. 31C is a cross sectional view taken on line c-c of FIG. 31A of the bipolar electrode.

FIG. 31A is a top plan view of a bipolar electrode 100. FIG. 31B is a rear view thereof. FIG. 31C is a cross sectional view taken on line c-c of FIG. 31A of the bipolar electrode.

The bipolar electrode 100 comprises a current collector sheet 101 having a first conductive area and a first insulating area on one surface thereof and a second conductive area and a second insulating area on the other surface thereof, a first electrode material mixture layer 102 carried on the first conductive area, and a second electrode material mixture layer 103 carried on the second conductive area.

The current collector sheet 101 includes an insulating sheet 104. The first conductive area comprises a first conductive layer 105 formed on one surface of the insulating sheet 104. The second conductive area comprises a second conductive layer 106 formed on the other surface of the insulating sheet 104.

A first insulating area 107 comprises an exposed portion left on one surface of the insulating sheet 104. A second insulating area 108 comprises an exposed portion left on the other surface of the insulating sheet 104.

The first conductive layer has an exposed portion 109 of first conductive layer not having the first electrode material mixture layer thereon. The second conductive layer has an exposed portion 110 of second conductive layer not having the second electrode material mixture layer thereon. The exposed portion 109 of first conductive layer and the exposed portion 110 of second conductive layer are positioned on opposite edges of the insulating sheet 104, which are to be utilized as connecting points to first and second terminals for providing electricity to the outside.

The first insulating area 107 is located at the edge of the insulating sheet 104 opposite to the exposed portion 109 of first conductive layer. The second insulating area 108 is located at the edge of the insulating sheet opposite to the exposed portion 110 of second conductive layer. Accordingly, the second insulating area 108 is located at the backside of the exposed portion 109 of first conductive layer, whereby short-circuiting between the first and second terminals is prevented when the exposed portion 109 of first conductive layer and the first terminal are connected. Likewise, when the exposed portion 110 of second conductive layer and the second terminal are connected, short-circuiting between the second terminal and the first conductive area can be prevented.

In the electrode shown in FIGS. 31A to 31C, the edge of the first electrode material mixture layer and that of the first conductive area which are adjacent to the first insulating area 107 and the edge of the second electrode material mixture layer and that of the second conductive area which are adjacent to the second insulating area 108 are covered with an insulating material 111. This insulating material further ensures the prevention of short-circuiting when the terminals are respectively connected to the exposed portion of first conductive layer and the exposed portion of second conductive layer.

In the electrode shown in FIGS. 31A to 31C, unlike an ordinary bipolar electrode, the first electrode material mixture layer 102 and the second electrode material mixture layer 103 are insulated from each other by the insulating sheet 104. Accordingly, a battery with a high capacity can be obtained by stacking the electrodes with separators interposed between each electrode and connecting them in parallel. Additionally, unlike a metal sheet used for a conventional current collector sheet, the insulating sheet is light in weight so that it is possible to obtain a lightweight battery.

Embodiment 15

In this embodiment, a method for producing a spiral type electrode assembly comprising the bipolar electrode will be described.

A spiral type electrode assembly can be produced using a hoop 201 for a bipolar electrode 205 as described above and a hoop 202 for a separator 206, as shown in FIG. 32. The bipolar electrode 205 and the separator 206 respectively coming from the hoops are laminated when they are passing through rollers 203a and 203b, which is then sent through rollers 203c to 203e and wound onto a core 207. Thereby, a spiral type electrode assembly 208 is obtained. In other words, it is possible to obtain a spiral type electrode assembly from two hoops by using the bipolar electrode.

Figure 33:
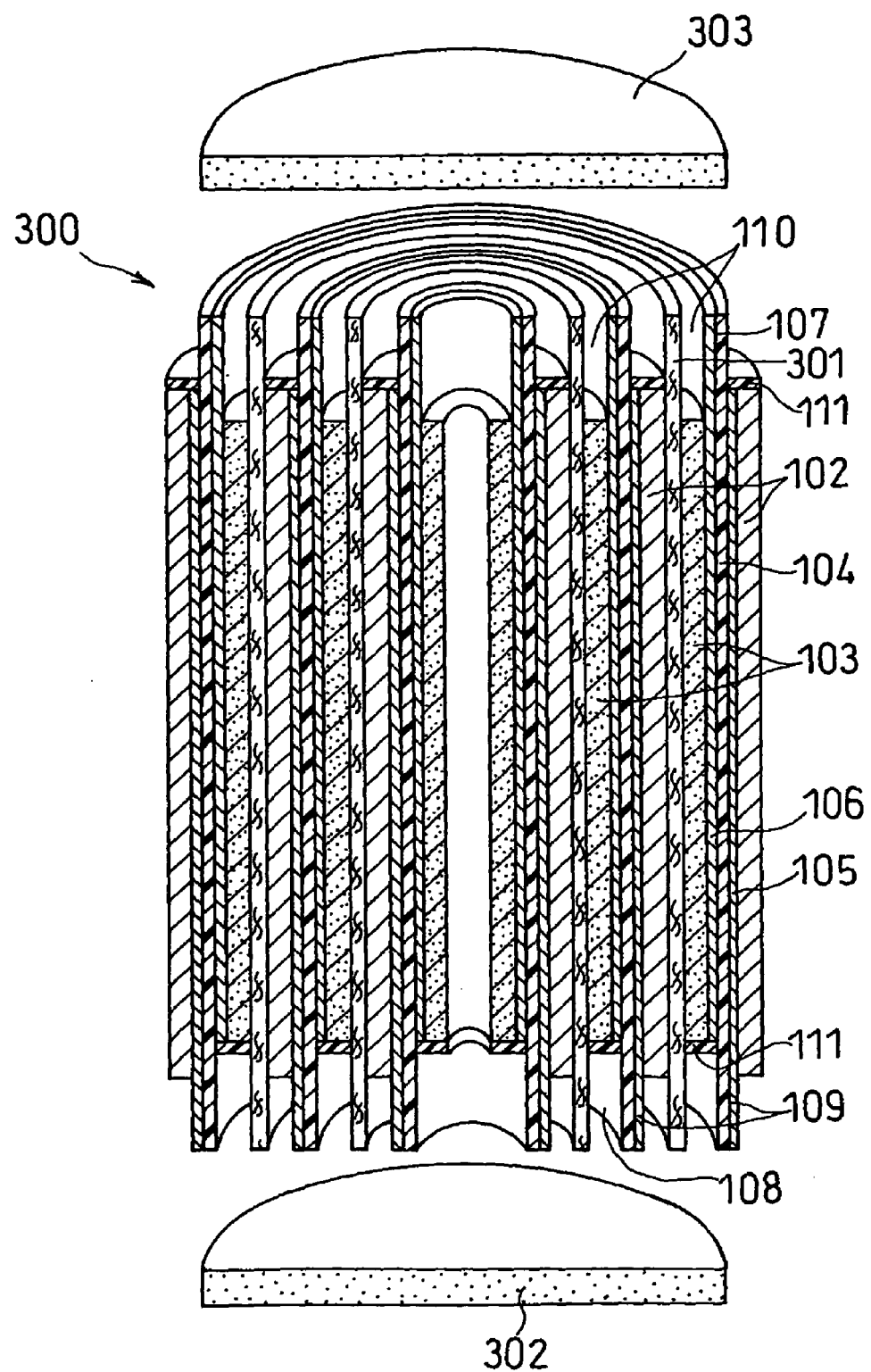
FIG. 33 is a schematic view illustrating, in cross section, the structure of a spiral type electrode assembly according to Embodiment 15 of the present invention.

A schematic view showing the structure of the obtained electrode assembly in cross section is shown in FIG. 33.

In the cross section of the electrode assembly 300, the bipolar electrode and the separator 301 are alternately arranged. Adjacent first electrode material mixture layer 102 and second electrode material mixture layer 103 face each other with the separator 301 therebetween.

The exposed portion 109 of first conductive layer not having the first electrode material mixture layer 102 thereon, which is a part of the first conductive layer 105 formed on one surface of the insulating sheet 104, is positioned at one end face of the electrode assembly (lower part of FIG. 33). The exposed portion 109 of first conductive layer is connected to a first terminal 302 at this end face. Likewise, the exposed portion 110 of second conductive layer not having the second electrode material mixture layer 103 thereon, which is a part of the second conductive layer 106, is positioned at the other end face of the electrode assembly (upper part of FIG. 33). The exposed portion of second conductive layer 110 is connected to a second terminal 303 at this end face.

At the backside of the exposed portion 109 of first conductive layer is located the second insulating area 108 comprising an exposed portion of the insulating sheet 104. The edge of the second electrode material mixture layer 103 and that of the second conductive layer 106 which are adjacent to the second insulating area 108 are covered with the insulating material 111. Accordingly, when the first terminal 302 and the exposed portion 109 of first conductive layer are connected, short-circuiting between the first terminal and the second electrode material mixture layer 103 or between the first terminal and the second conductive layer 106 does not occur.

At the backside of the exposed portion 110 of second conductive layer is located the first insulating area 107 comprising another exposed portion of the insulating sheet 104. The edge of the first electrode material mixture layer 102 and that of the first conductive layer 105 which are adjacent to the first insulating area 107 are covered with the insulating material 111. Accordingly, when the second terminal 303 and the exposed portion 110 of second conductive layer are connected, short-circuiting between the second terminal and the first electrode material mixture layer 102 or between the second terminal and the first conductive layer 105 does not occur.

In order to ensure the prevention of short-circuiting, the first insulating area 107 and the second insulating area 108 preferably have a width (height) of not less than 0.001 mm, more preferably not less than 0.1 mm.

In FIG. 33, a description was given of a spiral type electrode assembly. A stack type electrode assembly having a high capacity can also be produced by stacking a plurality of bipolar electrodes arranged in the same direction with separators interposed between each electrode. In this case, the exposed portion 109 of first conductive layer and the exposed portion 110 of second conductive layer should be arranged at opposite side faces in the stack type electrode assembly. This enables a connection between the exposed portion 109 of first conductive layer and the first terminal and a connection between the exposed portion 110 of second conductive layer and the second terminal without causing short-circuiting at each side face.

The electrode assembly described above has a simple structure so that it is possible to obtain a compact battery with high volumetric efficiency and a high capacity. The possibility of short-circuiting is also reduced greatly. A spiral type battery can be produced using two hoops, which simplifies the production process compared to conventional production process requiring four hoops and greatly reduces the possibility of displacement during winding process.

Example 1

A lithium ion secondary battery having a stack type electrode assembly was produced in the following procedure.

(i) Production of First Electrode

A sheet made of polyethylene terephthalate (hereinafter referred to as "PET") with a width of 198 mm, a length of 282 mm and a thickness of 7 μm was prepared. A plurality of rectangular (65 mm×46 mm) deposited copper layers arranged in three rows and six columns were formed in the same position of each surface of the PET sheet using a mask having openings in a matrix-like arrangement. The deposited copper layer had a thickness of 0.1 μm. Copper was deposited by an electron-beam method.

Subsequently, a first electrode material mixture paste was prepared by mixing 100 parts by weight of spherical graphite (graphitized mesophase microspheres) as an active material, 3 parts by weight of styrene butadiene rubber as a binder and a proper amount of an aqueous solution of carboxymethyl cellulose as a dispersing medium. The paste was applied onto the entire surface of each deposited layer except the center portion. As a result, two first electrode material mixture layers, each with 32 mm×46 mm, were formed on each deposited layer. Between the two first electrode material mixture layers was left an exposed portion of the deposited copper layer with a groove-like shape with a width of 1 mm not having the material mixture thereon. The film made of the paste was then dried and rolled by rollers to the dried film thickness of 70 μm.

Of the edges of the first electrode material mixture layer, to the edge opposite to the edge adjacent to the exposed portion of the deposited copper layer was applied polyvinylidene fluoride with a width of 0.3 mm as an insulating material. Thereby, a group of first electrodes having the first electrode material mixture layers arranged in six rows and six columns on each surface thereof was obtained.

(ii) Production of Second Electrode

A second electrode having second electrode material mixture layers on each surface thereof was produced.

A PET sheet with a width of 198 mm, a length of 282 mm and a thickness of 7 μm was prepared. A plurality of rectangular (64 mm×45 mm) deposited aluminum layers arranged in three rows and six columns were formed in the same position of each surface of the PET sheet using a mask having openings in a matrix-like arrangement. The deposited Al layer had a thickness of 0.1 μm. Al was deposited by a resistance heating method.

Subsequently, a second electrode material mixture paste was prepared by mixing 100 parts by weight of lithium cobaltate ($LiCoO_2$) as an active material, 3 parts by weight of acetylene black as a conductive material, 7 parts by weight of polyvinylidene fluoride as a binder and a proper amount of an aqueous solution of carboxymethyl cellulose as a dispersing medium. The paste was then applied onto the entire surface of each deposited layer except the center portion. As a result, two second electrode material mixture layers, each with 31 mm×45 mm, were formed on each deposited layer. Between the two second electrode material mixture layers was left an exposed portion of the deposited Al layer with a groove-like shape with a width of 2 mm not having the material mixture thereon. The film made of the paste was then dried and rolled by rollers to the dried film thickness of 70 μm.

Of the edges of the second electrode material mixture layer, to the edge opposite to the edge adjacent to the exposed portion of the deposited layer was applied polyvinylidene fluoride with a width of 0.3 mm as an insulating material. Thereby, a group of second electrodes having the second electrode material mixture layers arranged in six rows and six columns on each surface thereof was obtained.

Meanwhile, a second electrode having the second electrode material mixture layers only on one surface thereof was produced in the same manner as above except that the conductive layers, the second electrode material mixture layers and the insulating material were not arranged on the other surface thereof.

(iii) Production of Electrode Assembly

A group of second electrodes having the second electrode material mixture layers on both surfaces thereof was sandwiched by two groups of first electrodes having the first electrode material mixture layers on both surfaces thereof with separators interposed between each group such that the first electrode material mixture layers and the second electrode material mixture layers faced each other. Further, the electrode plates were placed such that the exposed portion of deposited copper layer and polyvinylidene fluoride of the first electrode faced polyvinylidene fluoride and the exposed portion of deposited Al layer of the second electrode, respectively. A pair of the second electrodes having the second electrode material mixture layers only on one surface thereof were placed at the outermost sides such that they sandwiched the internal electrode therebetween, which was then pressed. As a result, an assemblage comprising a plurality of electrode plate stacks was obtained.

Subsequently, the assemblage comprising a plurality of electrode plate stacks was divided into respective electrode plate stacks by cutting it along the cutting lines aligned with the center of the exposed portion of deposited copper layer of the first electrode and the center of the exposed portion of deposited Al layer of the second electrode. As a result, 36 electrode plate stacks were obtained at a time by a series of processes of application and stacking.

Half-melted copper particles were sprayed onto the side face where the exposed portion of deposited copper film of the first current collector sheet and the PET resin portion of the second current collector sheet were alternately arranged. As a result, a copper film with a thickness of 0.5 mm was formed on the aforesaid side face. The exposed portion of deposited copper layer was embedded to a depth of 0.2 mm into the copper film. This copper film was used as the negative electrode terminal.

Subsequently, half-melted aluminum particles were sprayed onto the side face where the exposed portion of deposited Al layer of the second current collector sheet and the PET resin portion of the first current collector sheet were alternately arranged. As a result, an aluminum film with a thickness of 0.5 mm was formed on the aforesaid side face. The exposed portion of deposited Al layer was embedded to a depth of 0.2 mm into the aluminum film. This aluminum film was used as the positive electrode terminal.

[Evaluation]

Lead wires were respectively connected to the copper film (negative electrode terminal) and the aluminum film (positive electrode terminal) of the obtained electrode assembly, and the electrode assembly was immersed in an electrolyte. With the use of an external charge/discharge device, a charge/discharge test was performed in an atmosphere of 20° C. The electrolyte used here was prepared by dissolving $LiPF_6$ in a solvent mixture of ethylene carbonate (EC) and ethyl methyl carbonate (EMC) at a volume ratio of 30:70 at a $LiPF_6$ concentration of 1 mol/L.

The charging and discharging was performed in a current mode of 2.5 mA/cm$^2$ for each electrode area. The end-of-charge voltage was 4.2 V. The end-of-discharge voltage was 3.0 V. The electric capacity obtained under the above conditions was 900 mAh. Further, a mechanical impact was applied to the lithium ion secondary battery of Example 1 by dropping it, but any abnormality such as a voltage drop derived from internal short-circuiting was not found.

Example 2

A lithium ion secondary battery having a stack type electrode assembly was produced in the following procedure.

A current collector sheet of first electrode was produced as follows.

A sheet made of polyethylene terephthalate (hereinafter referred to as "PET") with a width of 198 mm, a length of 282 mm and a thickness of 7 μm was prepared. A mask with openings in a matrix-like arrangement was attached to each surface of the PET sheet, and PET sheet portions exposed through the openings were then plated with copper. As a result, a plurality of rectangular (65 mm×46 mm) plated copper layers arranged in three rows and six columns were formed in the same position of each surface of the PET sheet. The plated copper layer had a thickness of 1 μm. The copper plating was performed by an electroplating method.

Subsequently, a current collector sheet of second electrode was produced as follows.

A sheet made of polyethylene terephthalate (hereinafter referred to as "PET") with a width of 198 mm, a length of 282 mm and a thickness of 7 μm was prepared. A mask with openings in a matrix-like arrangement was attached to each surface of the PET sheet, and Al was then deposited on PET sheet portions exposed through the openings. As a result, a plurality of rectangular (65 mm×46 mm) deposited Al layers arranged in three rows and six columns were formed in the same position of each surface of the PET sheet. The deposited Al layer had a thickness of 0.1 μm. The Al deposition was performed by an rf heating method.

A lithium ion secondary battery was produced in the same manner as in Example 1, except that the current collector sheets described above were used.

[Evaluation]

A charge/discharge test similar to the one performed in Example 1 was performed using the obtained battery. The lithium ion secondary battery of Example 2 had an electric capacity of 900 mAh. Any abnormality such as a voltage drop derived from internal short-circuiting was not found even when a mechanical impact was applied to the lithium ion secondary battery of Example 2 by dropping it.

For comparison, conventionally used negative electrode and positive electrode were produced using a core material made of a copper foil and a core material made of an aluminum foil, respectively. In order to obtain a battery with the same capacity as above, the battery volume had to be 1.2 times larger than that of lithium ion secondary batteries of Example 1 and 2. A mechanical impact was applied to this lithium ion secondary battery by dropping it, and a slight voltage drop derived from internal short-circuiting was found.

Example 3

A lithium ion secondary battery having a stack type electrode assembly was produced in the following procedure.

A current collector sheet of first electrode was produced as follows.

A frame made of polyethylene terephthalate having openings in a matrix-like arrangement, i.e., having a plurality of rectangular (65 mm×46 mm) openings arranged in three rows and six columns was prepared. The frame had an outer dimension of width 198 mm, length 282 mm and thickness 7 μm.

A plurality of rectangular (65 mm×46 mm) copper conductive sheets (with a thickness of 7 μm) were fitted into the openings of the frame, and the frame and the conductive sheet were fixed with an adhesive. Thereby, a current collector sheet of first electrode having a conductive area and an insulating area was obtained.

Subsequently, a current collector sheet of second electrode was produced as follows.

A frame made of polyethylene terephthalate having openings in a matrix-like arrangement, i.e., having a plurality of rectangular (64 mm×45 mm) openings arranged in three rows and six columns was prepared. The frame had an outer dimension of width 198 mm, length 282 mm and thickness 7 μm.

A plurality of rectangular (64 mm×45 mm) aluminum conductive sheets (with a thickness of 7 μm) were fitted into the openings of the frame, and the frame and the conductive sheet were fixed with an adhesive. Thereby, a current collector sheet of second electrode having a conductive area and an insulating area was obtained.

A lithium ion secondary battery was produced in the same manner as in Example 1, except that the current collector sheets described above were used.

[Evaluation]

A charge/discharge test similar to the one performed in Example 1 was performed using the obtained battery. The lithium ion secondary battery of Example 3 had an electric capacity of 900 mAh. Any abnormality such as a voltage drop derived from internal short-circuiting was not found even when a mechanical impact was applied to the lithium ion secondary battery of Example 3 by dropping it.

Example 4

A lithium ion secondary battery having a stack type electrode assembly was produced in the following procedure.

(i) Production of First Electrode

Figure 34:
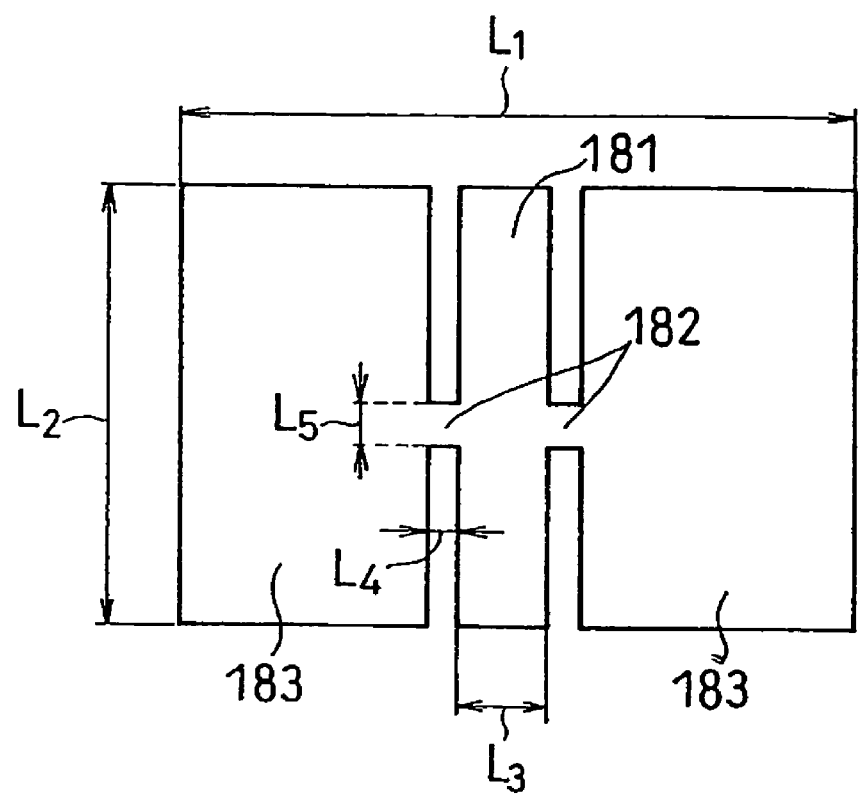
FIG. 34 is a top plan view of a conductive layer having a small-width portion according to one example of the present invention.

A sheet made of polyethylene terephthalate (hereinafter referred to as "PET") with a width of 198 mm, a length of 282 mm and a thickness of 7 μm was prepared. With the use of a mask having openings with a predetermined shape, a plurality of deposited copper layers, each having the shape as shown in FIG. 34, arranged in three rows and six columns were formed in the same position of each surface of the PET sheet. In the diagram, the dimensions L1 to L5 were 65 mm, 46 mm, 0.8 mm, 0.1 mm and 2 mm, respectively. The deposited copper layer had a thickness of 0.1 μm. The copper deposition was performed by an electron beam method.

A first electrode material mixture paste prepared in the same manner as in Example 1 was applied onto the entire surface of each deposited layer except a center portion 181 and a small-width portion 182. As a result, two first electrode material mixture layers, each with 32 mm×46 mm, were formed on the main portion 183 of each deposited layer. The film made of the paste was then dried and rolled by rollers to the dried film thickness of 70 μm.

Of the edges of the first electrode material mixture layer, to the edge opposite to the connecting point for connecting to a current collecting terminal was applied polyvinylidene fluoride with a width of 0.3 mm as an insulating material. Thereby, a group of first electrodes having first electrode material mixture layers arranged in six rows and six columns on each surface thereof was obtained.

(ii) Production of Second Electrode

A second electrode having second electrode material mixture layers on each surface thereof was produced.

A PET sheet with a width of 198 mm, a length of 282 mm and a thickness of 7 μm was prepared. With the use of a mask having openings with a predetermined shape, a plurality of deposited aluminum layers, each having the shape as shown in FIG. 34, arranged in three rows and six columns were formed in the same position of each surface of the PET sheet. In the diagram, the dimensions L1 to L5 were 64 mm, 45 mm, 0.8 mm, 0.6 mm and 2 mm, respectively. The deposited Al layer had a thickness of 0.1 μm. The Al deposition was performed by a resistance heating method.

A second electrode material mixture paste prepared in the same manner as in Example 1 was applied onto the main portion 183 of each deposited layer. As a result, two second electrode material mixture layers, each with 31 mm×45 mm, were formed on each deposited layer. The film made of the paste was then dried and rolled by rollers to the dried film thickness of 70 μm.

Of the edges of the second electrode material mixture layer, to the edge opposite to the connecting point for connecting to a current collecting terminal was applied polyvinylidene fluoride with a width of 0.3 mm as an insulating material. Thereby, a group of second electrodes having pieces of the second electrode material mixture layer arranged in six rows and six columns on each surface thereof was obtained.

Meanwhile, a second electrode having the second electrode material mixture layers only on one surface thereof was produced in the same manner as above except that the conductive layers, the second electrode material mixture layers and the insulating material were not arranged on the other surface thereof.

(iii) Production of Electrode Assembly

A group of second electrodes having the second electrode material mixture layers on both surfaces thereof was sandwiched by two groups of first electrodes having the first electrode material mixture layers on both surfaces thereof with separators interposed between each group. A pair of the second electrodes having the second electrode material mixture layers only on one surface thereof were placed at the outermost sides such that they sandwiched the internal electrode therebetween, which was then pressed. As a result, an assemblage comprising a plurality of electrode plate stacks was obtained.

Similar to Example 1, the assemblage comprising a plurality of electrode plate stacks was then divided into respective electrode plate stacks by cutting it along the cutting lines aligned with the center of the exposed portion of deposited copper layer of the first electrode and the center of the exposed portion of deposited Al layer of the second electrode. As a result, 36 electrode plate stacks were obtained.

Similar to Example 1, half-melted copper particles were sprayed onto the side face where the exposed portion of deposited copper film of the first current collector sheet and the PET resin portion of the second current collector sheet were alternately arranged to form a negative electrode terminal made of copper film. Likewise, half-melted aluminum particles were sprayed onto the side face where the exposed portion of deposited Al layer of the second current collector sheet and the PET resin portion of the first current collector sheet were alternately arranged to form a positive electrode terminal made of aluminum film.

[Evaluation]

A charge/discharge test similar to the one performed in Example 1 was performed using the obtained battery. The obtained electric capacity was 900 mAh. Subsequently, 100 electrode assemblies analogous thereto were produced, which were then immersed in an electrolyte similar to the one used above. The side faces of each thereof except the side faces having the positive and negative electrode terminals exposed were covered with an aluminum laminate sheet. Thereby, lithium ion secondary batteries were produced. These batteries were externally short-circuited by connecting a shunt resistance of 10 mΩ, and the surface temperature of each of the batteries was measured at 5 minutes and 30 minutes thereafter. As a result, no battery had an increased surface temperature of not less than 80° C. The batteries were later disassembled and the inside thereof was observed. It was found that many of the small-width portions of the deposited layer formed on the current collector sheet were melted and broken.

Example 5

A lithium ion secondary battery having a stack type electrode assembly was produced in the following procedure.

(i) Production of First Electrode

A copper foil with a width of 33 mm, a length of 47 mm and a thickness of 10 μm was prepared. Four groove-like thin portions with a width of 0.1 mm and a thickness of 1 μm were formed at 0.4 mm in from the edges of the copper foil by etching process as shown in FIG. 10.

Three edges of the copper foil were covered with a masking tape as shown in FIGS. 11 and 12. The masking tape was the one comprising a substrate made of polyethylene terephthalate with a thickness of 25 μm and an acrylic resin-based adhesive applied thereon.

A first electrode material mixture similar to the one used in Example 1 was applied onto the exposed portion of copper foil of the obtained current collector sheet. The film made of the paste was dried and rolled by rollers to the dried film thickness of μm. The portion located outside of the groove-like thin portion (corresponding to the thin portion 86a' in FIG. 10) at the edge of the copper foil not covered with the masking tape was left as a connecting point for connecting to a current collecting terminal. Of the edges of the first electrode material mixture layer (32 mm×46 mm), to the edge opposite to the connecting point for connecting to a current collecting terminal was applied polyvinylidene fluoride with a width of 0.3 mm as an insulating material.

(ii) Production of Second Electrode

An aluminum foil with a width of 33 mm, a length of 47 mm and a thickness of 10 μm was prepared. Four groove-like thin portions with a width of 0.1 mm and a thickness of 1 μm were formed at 0.4 mm in from the edges of the aluminum foil by etching process as shown in FIG. 10. Three edges of the aluminum foil were then covered with a masking tape similar to the one used in the first electrode.

A second electrode material mixture similar to the one used in Example 1 was applied onto the exposed portion of aluminum foil of the obtained current collector sheet. The film made of the plate was dried and rolled by rollers to the dried film thickness of 70 μm. The portion located outside of the groove-like thin portion (corresponding to the thin portion 86a' in FIG. 10) at the edge of the aluminum foil not covered with the masking tape was left as a connecting point for connecting to a current collecting terminal. Of the edges of the second electrode material mixture layer (31 mm×45 mm), to the edge opposite to the connecting point for connecting to a current collecting terminal was applied polyvinylidene fluoride with a width of 0.3 mm as an insulating material.

Meanwhile, a second electrode having the second electrode material mixture layers only on one surface thereof was produced in the same manner as above except that the second electrode material mixture layers and the insulating material were not arranged on the other surface thereof.

Similar to Example 1, a group of second electrodes having the second electrode material mixture layers on both surfaces thereof was sandwiched by two groups of first electrodes having the first electrode material mixture layers on both surfaces thereof with separators interposed between each group. A pair of the second electrodes having the second electrode material mixture layers only on one surface thereof were placed at the outermost sides such that they sandwiched the internal electrode therebetween, which was then pressed. As a result, an assemblage comprising a plurality of electrode plate stacks was obtained.

Half-melted copper particles were sprayed onto the side face where the exposed portion of copper foil of the first electrode and the masking tape of the second electrode were alternately arranged. As a result, a copper film with a thickness of 0.5 mm was formed on the aforesaid side face. The exposed portion of copper foil was embedded to a depth of 0.2 mm into the copper film. This copper film was used as the negative electrode terminal.

Subsequently, half-melted aluminum particles were sprayed onto the side face where the exposed portion of Al foil of the second electrode and the masking tape of the first electrode were alternately arranged. As a result, an aluminum film with a thickness of 0.5 mm was formed on the aforesaid side face. The exposed portion of aluminum foil was embedded to a depth of 0.2 mm into the aluminum film. This aluminum film was used as the positive electrode terminal.

[Evaluation]

A charge/discharge test similar to the one performed in Example 1 was performed using the obtained electrode assembly. The obtained electric capacity was 900 mAh. Subsequently, 100 electrode assemblies analogous thereto were produced, which were then immersed in an electrolyte similar to the one used above. The side faces of each thereof except the side faces having the positive and negative electrode terminals exposed were covered with an aluminum laminate sheet. Thereby, lithium ion secondary batteries were produced. These batteries were externally short-circuited by connecting a shunt resistance of 10 mΩ, and the surface temperature of each of the batteries was measured at 5 minutes and 30 minutes thereafter. As a result, no battery had an increased surface temperature of not less than 80° C. The batteries were later disassembled and the inside thereof was observed. It was found that many of the groove-like thin portions formed on the copper foil and the aluminum foil were melted and broken.

Example 6

A lithium ion secondary battery having a spiral type electrode assembly was produced in the following procedure. A production process therefor will be described referring to FIG. 35.

(i) Production of Current Collector Sheet

A sheet 403 made of polyethylene terephthalate (hereinafter referred to as "PET") with a thickness of 7 μm was prepared. With the use of a mask having openings in a matrix-like arrangement, deposited aluminum films 401 were formed on one surface of the PET sheet 403 as shown in FIG. 35A. The deposited Al film 401 had a thickness of 0.1 μm.

Likewise, deposited copper films 402 arranged in reverse to the deposited Al films 401 were formed on the other surface of the PET sheet 403 along the pattern shown by the broken lines. The deposited Cu film had a thickness of 0.1 μm.

Figure 35:
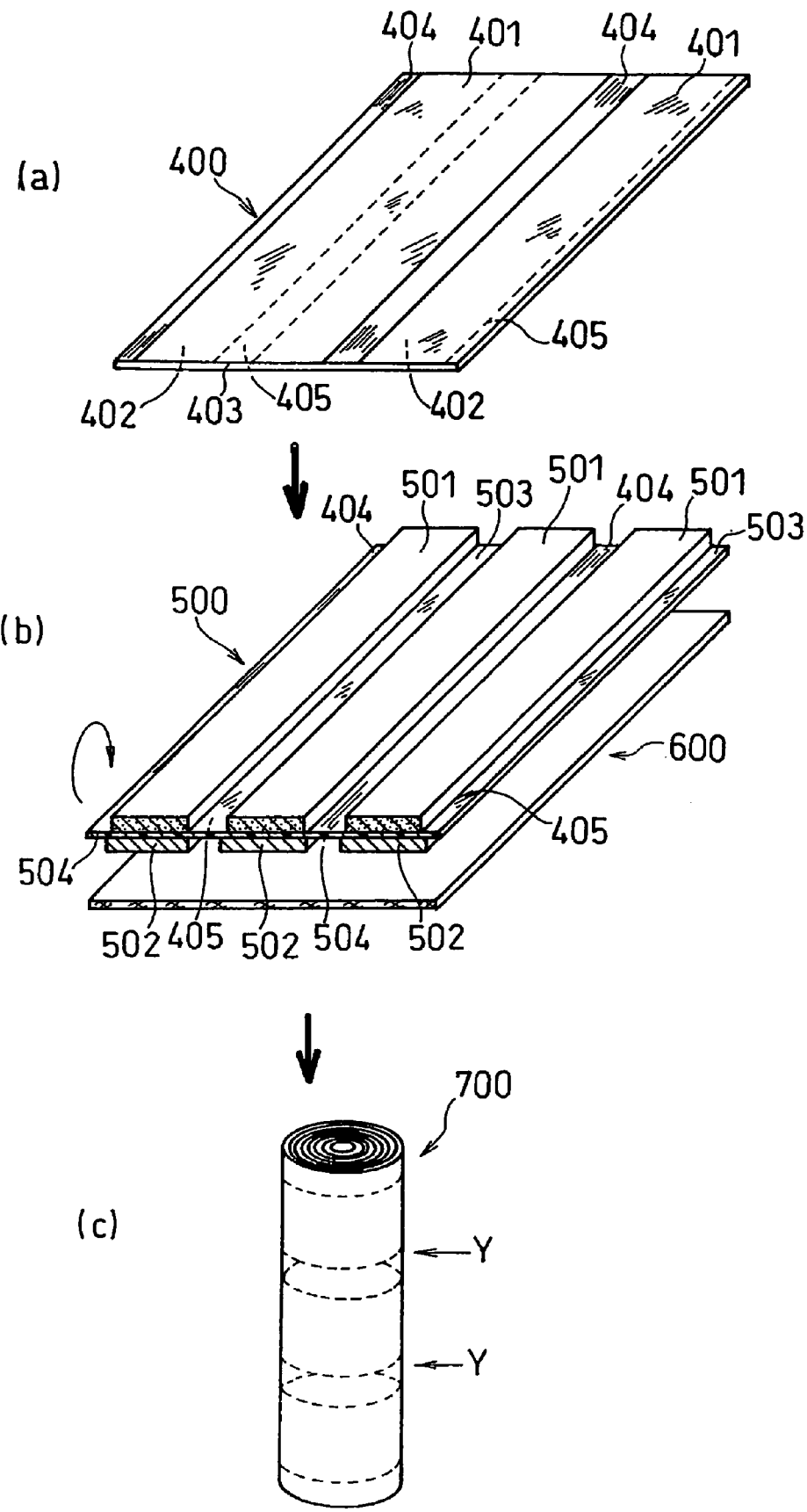
FIG. 35 is a diagram showing a production process of a spiral type electrode assembly using a bipolar electrode.

Stripe-shaped insulating portions 404 and 405 comprising an exposed portion of the PET sheet were respectively left on the surface of the PET sheet having the deposited Al films 401 formed thereon and the surface of the same having the deposited Cu films 402 formed thereon. Thereby, a current collector sheet 400 was obtained. In FIG. 35, the current collector sheet 400 is short because it is schematically drawn, but, in practice, a hoop comprising an elongated PET sheet was used.

(ii) First Electrode Mixture Layer

A first electrode material mixture paste was prepared by mixing 100 parts by weight of lithium cobaltate (LiCoO$_2$) as an active material, 3 parts by weight of acetylene black as a conductive material, 7 parts by weight of polyvinylidene fluoride as a binder and a proper amount of an aqueous solution of carboxymethyl cellulose as a dispersing medium. This paste was applied onto the deposited Al films 401 as shown in FIG. 35(b) to form three strip-shaped first electrode material mixture layers 501. Thereafter, the film made of the paste was dried and rolled by rollers to the dried film thickness of 70 μm.

Of the edges of the first electrode material mixture layer, on the edge adjacent to the stripe-shaped insulating portion 404 was formed a film of polyvinylidene fluoride (PVDF) (not shown in the diagram) with a width of 0.3 mm and a dried thickness of 70 μm as an insulating material. On the backside of the stripe-shaped insulating portion 405 existed an exposed portion 503 of deposited Al film.

(iii) Second Electrode Material Mixture Layer

A second electrode material mixture paste was prepared by mixing 100 parts by weight of spherical graphite (graphitized mesophase microspheres) as an active material, 3 parts by weight of styrene butadiene rubber as a binder and a proper amount of an aqueous solution of carboxymethyl cellulose as a dispersing medium. The paste was applied onto the deposited Cu films 402 as shown in FIG. 35(b) to form three strip-shaped second electrode material mixture layers 502. Thereafter, the film made of the paste was dried and rolled by rollers to a dried film thickness of 70 μm.

Of the edges of the second electrode material mixture layer, to the edge adjacent to the stripe-shaped insulating portion 405 was formed a film of PVDF (not shown in the diagram) with a width of 0.3 mm and a dried thickness of 70 μm as an insulating material. On the backside of the stripe-shaped insulating portion 404 existed an exposed portion 504 of deposited Cu film.

(iv) Production of Electrode Assembly

A spiral winding process was performed using a hoop for the produced bipolar electrode 500 and a hoop for a separator 600. In the spiral winding process, the bipolar electrode 500 and the separator 600 were laminated and spirally wound by using an apparatus as shown in FIG. 32. As a result, an elongated cylindrical electrode assemblage 700 comprising a plurality of spiral type electrode assemblies was obtained.

The assemblage 700 was divided into respective electrode assemblies by cutting the assemblage 700 along the center line of the stripe-shaped insulating portion 404 (exposed portion 504 of deposited Cu film) and the center line of the stripe-shaped insulating portion 405 (exposed portion 503 of deposited Al film), i.e. along the cutting lines indicated by Y. As a result, three electrode assemblies were obtained at a time by a series of processes of application and winding.

The end face (first bottom) where the edge of the first electrode material mixture layer, the exposed portion 503 of deposited Al film and the PVDF film covering the edge of the second electrode material mixture layer were sequentially arranged was covered with a mask for forming an inlet, and half-melted Al particles were then sprayed thereto. As a result, an Al film with a thickness of 0.5 mm was formed on the first bottom. The exposed portion 503 of deposited Al film was embedded to a depth of 0.2 mm into the Al film. The end face of the second electrode material mixture layer arranged at the first bottom was covered with the PVDF film so that the Al film formed by the spraying and the second electrode material mixture did not come in contact with each other. This Al film was used as the positive electrode terminal.

The end face (second bottom) where the edge of the second electrode material mixture layer, the exposed portion 504 of deposited Cu film and the PVDF film covering the edge of the first electrode material mixture layer were sequentially arranged was covered with a mask for forming an inlet, and half-melted Cu particles were then sprayed thereto. As a result, a Cu film with a thickness of 0.5 mm was formed on the second bottom. The exposed portion 504 of deposited Cu film was embedded to a depth of 0.2 mm into the Cu film. The end face of the first electrode material mixture layer arranged at the second bottom was covered with the PVDF film so that the Cu film formed by the spraying and the first electrode material mixture did not come in contact with each other. This Cu film was used as the negative electrode terminal.

The electrode assembly thus obtained was housed into a cylindrical battery case made of stainless steel, and the Cu film of the second bottom of the electrode assembly was connected to the internal bottom face of the case. The Al film of the first bottom of the electrode assembly was connected to the backside of a sealing plate having an insulating gasket arranged therearound with an aluminum wire. Subsequently, an electrolyte was injected into the case through the inlet, and the electrolyte was impregnated into the electrode assembly. The opening of the case was then sealed with the sealing plate, thereby a cylindrical battery was produced.

The electrolyte used here was prepared by dissolving $LiPF_6$ in a solvent mixture of ethylene carbonate (EC) and ethyl methyl carbonate (EMC) at a volume ratio of 30:70 at a $LiPF_6$ concentration of 1 mol/L.

Comparative Example 1

A lithium ion secondary battery having a spiral type electrode assembly was produced in the same manner as the conventional one.

More specifically, there was produced a first electrode comprising a strip-shaped Al foil and first electrode material mixture layers carried on both surfaces thereof and having the same composition and thickness as in Example 6. There was produced a second electrode comprising a strip-shaped Cu foil and second electrode material mixture layers carried on both surfaces thereof and having the same composition and thickness as in Example 6. Each of the electrode plates had a portion for connecting a current collecting tab where the electrode material mixture layer was unapplied, and a current collecting tab was connected thereto. An electrode assembly was produced using a hoop for the first electrode, a hoop for the second electrode and two hoops for separator.

The electrode assembly thus obtained was housed into a cylindrical battery case made of stainless steel 1.2 times larger in diameter than the one used in Example 6, and a lead for the second electrode was welded to the internal bottom face of the case. A lead for the first electrode was connected to the backside of a sealing plate having an insulating gasket arranged therearound. An electrolyte similar to the one used in Example 6 was then injected into the case, and the electrolyte was impregnated into the electrode assembly. The opening of the case was then sealed with the sealing plate, thereby a cylindrical battery was produced. The reason why Comparative Example 1 used a battery case larger than the one used in Example 6 was because the current collecting tab was contained in the electrode assembly of Comparative Example 1 and therefore the diameter of the electrode assembly was increased.

[Evaluation]

Each of the obtained batteries was subjected to a charge/discharge test in an atmosphere of 20° C. The charging and discharging was performed in a current mode of 2.5 $mA/cm^2$ for each electrode area. The end-of-charge voltage was 4.2 V. The end-of-discharge voltage was 3.0 V. The electric capacity obtained under the above conditions was 900 mAh. Therefore, the battery of Example 6 had a volumetric energy density 1.2 times greater than that of Example 1.

As described above, a conductive area and an insulating area are present on the surface of a current collector sheet of the present invention, and therefore an electrode material mixture can be carried on the conductive area of the current collector sheet while an electrode material mixture is not carried on the insulating area thereof. The possibility of internal short-circuiting in an electrochemical device is greatly reduced by such structure. Further, according to the present invention, the structure of the positive and negative electrode terminals is simple, and a current collecting tab and a current collecting lead are not necessary. Accordingly, it is possible to provide a small and highly reliable electrochemical device with a high electric capacity. Moreover, according to the present invention, it is possible to efficiently produce a plurality of electrochemical devices at a time. Furthermore, according to the present invention, it is possible to simplify production process for a spiral type electrode assembly as well as to greatly reduce the possibility of displacement during spiral winding process.

As described above, the present invention is preferably applicable for a power source for highly reliable cell phones, mobile information terminal devices, camcorders, personal computers, PDAs, mobile audio equipment, electric vehicles and devices for load leveling, particularly for a non-aqueous electrolyte secondary battery such as a lithium ion secondary battery.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrochemical device having an electrode assembly comprising:
    a first electrode;
    a second electrode; and
    a separator interposed between said first electrode and said second electrode, said first electrode, said second electrode and said separator being stacked on one another, wherein:
    said first electrode comprises a first insulating sheet, a first conductive layer formed on a surface of said first insulating sheet, and a first electrode material mixture layer formed on a surface of said first conductive layer, said first insulating sheet having a peripheral area which includes outer edges of the first insulating sheet and extends from the outer edges toward a center of the first insulating sheet,
    said first conductive layer is formed so that said first insulating sheet is exposed only at a first portion of the peripheral area of said first insulating sheet, and a second portion of the peripheral area of said insulating sheet which is a remaining portion other than the first portion of the peripheral area of said first insulating sheet and a center area of said first insulating sheet which is a portion other than the peripheral area of the first insulating sheet are covered,
    said first conductive layer comprises a first electrode material mixture layer carrying portion carrying said first electrode material mixture layer, and a first terminal connecting portion not carrying said first electrode material mixture layer, and said first terminal connecting portion is arranged on the second portion of the peripheral area of said first insulating sheet, wherein:

said second electrode comprises a second insulating sheet, a second conductive layer formed on a surface of said second insulating sheet, and a second electrode material mixture layer formed on a surface of said second conductive layer, said second insulating sheet having a peripheral area which includes outer edges of the second insulating sheet and extends from the outer edged toward a center of the second insulating sheet, said second conductive layer is formed so that said second insulating sheet is exposed only at a first portion of the peripheral area of said second insulating sheet, and a second portion of the peripheral area of the second insulating sheet which is a remaining portion other than the first portion of the peripheral area of said second insulating sheet and a center area of said second insulating sheet which is a portion other than the peripheral area of the second insulating sheet are covered, said second conductive layer comprises a second electrode material mixture layer carrying portion carrying said second electrode material mixture layer, and a second terminal connecting portion not carrying said second electrode material mixture layer, said second terminal connecting portion is arranged on the second portion of the peripheral area of said second insulating sheet, and wherein said first terminal connecting portion and said second terminal connecting portion are arranged so as not to face each other.

2. The electrochemical device in accordance with claim 1, wherein a contour of said first electrode and a contour of said second electrode overlap each other in the stacking direction.

* * * * *